(12) United States Patent
Gwag

(10) Patent No.: US 9,565,930 B2
(45) Date of Patent: Feb. 14, 2017

(54) ARTICULATION TYPE SUPPORTER

(71) Applicant: Ace-Hinge Tech Co., Ltd., Gyeonggi-do (KR)

(72) Inventor: Su Man Gwag, Seoul (KR)

(73) Assignee: ACE-HINGE TECH CO., LTD., Gyeonggi-do (KR)

( * ) Notice: Subject to any disclaimer, the term of this patent is extended or adjusted under 35 U.S.C. 154(b) by 109 days.

(21) Appl. No.: 14/586,058

(22) Filed: Dec. 30, 2014

(65) Prior Publication Data

US 2015/0182018 A1 Jul. 2, 2015

(30) Foreign Application Priority Data

Dec. 31, 2013 (KR) .......................... 10-2013-0168362
Apr. 15, 2014 (KR) .......................... 10-2014-0044690

(51) Int. Cl.
*A47B 97/04* (2006.01)
*A47B 23/02* (2006.01)

(52) U.S. Cl.
CPC ........ *A47B 23/02* (2013.01); *A47B 2220/0094* (2013.01)

(58) Field of Classification Search
USPC ........................................................ 248/447
See application file for complete search history.

(56) References Cited

U.S. PATENT DOCUMENTS

| | | | | |
|---|---|---|---|---|
| 4,402,481 A | * | 9/1983 | Sasaki | F16M 11/12 248/282.1 |
| 4,687,167 A | * | 8/1987 | Skalka | A47B 21/0314 108/103 |
| 4,703,909 A | * | 11/1987 | Dayton | F16M 11/04 248/280.11 |
| 4,768,744 A | * | 9/1988 | Leeds | F16M 11/04 248/280.11 |
| 5,092,552 A | * | 3/1992 | Dayton | F16C 11/0661 248/181.1 |

(Continued)

FOREIGN PATENT DOCUMENTS

| | | |
|---|---|---|
| JP | 06-038200 | 2/1994 |
| KR | 10-1035119 | 5/2011 |

(Continued)

*Primary Examiner* — Monica Millner
(74) *Attorney, Agent, or Firm* — Roberts Mlotkowski Safran Cole & Calderon P.C.

(57) ABSTRACT

Disclosed is an articulation type supporter which is formed in a multiple-joint structure configured to support an item such as a book, a portable device, etc. wherein the rotation of the movable frame based on the weight of the item is limited about the connected portion of the base frame, and it is convenient for a user to handle. The featured configuration includes the base frame installed at the fixed structure, a movable frame of which one end is connected through the first hinge connection unit to the base frame, and the connection frames which are connected in series from the other end of the movable frame through the second hinge connection unit, wherein the first hinge connection unit includes the first brake unit configured to limit the rotations of the movable frame in response to the weight applied from the other end of the movable frame while providing the upward and downward rotation motion of the movable frame in response to the user's force.

23 Claims, 18 Drawing Sheets

(56) References Cited

U.S. PATENT DOCUMENTS

| | | | | |
|---|---|---|---|---|
| 5,123,621 | A * | 6/1992 | Gates | F16M 11/04 248/184.1 |
| 5,497,214 | A * | 3/1996 | Labree | F16M 13/02 248/187.1 |
| 5,671,900 | A * | 9/1997 | Cutler | A47B 23/007 248/448 |
| 6,138,970 | A * | 10/2000 | Sohrt | F16M 11/10 248/278.1 |
| 6,209,835 | B1 * | 4/2001 | Walrath | A47F 5/08 248/276.1 |
| 6,857,610 | B1 * | 2/2005 | Conner | F16M 11/04 248/284.1 |
| 7,604,210 | B2 * | 10/2009 | Oddsen, Jr. | F16M 11/04 248/280.11 |
| 7,677,515 | B2 * | 3/2010 | Oddsen, Jr. | F16M 11/04 248/274.1 |
| 7,773,371 | B2 * | 8/2010 | Hillman | F16M 11/04 248/917 |
| 8,162,271 | B2 * | 4/2012 | Li | F16M 11/04 248/162.1 |
| 8,359,982 | B2 * | 1/2013 | Lebel | A47B 3/00 108/44 |
| 8,469,323 | B1 * | 6/2013 | Deros | F16M 11/105 248/123.11 |
| 8,955,905 | B2 * | 2/2015 | Boenigk | A47C 7/70 297/135 |
| 9,140,406 | B2 * | 9/2015 | Simon | F16M 13/022 |
| 2005/0006542 | A1 * | 1/2005 | Henning | F16C 11/10 248/274.1 |
| 2006/0186281 | A1 * | 8/2006 | Thiessen | B25H 1/0021 248/123.11 |
| 2006/0261228 | A1 * | 11/2006 | Hung | F16M 11/02 248/282.1 |
| 2006/0273231 | A1 * | 12/2006 | Huang | F16M 11/04 248/371 |
| 2008/0029661 | A1 * | 2/2008 | Chen | F16M 11/04 248/176.1 |
| 2008/0067317 | A1 * | 3/2008 | Altonji | F16M 11/04 248/604 |
| 2008/0073946 | A1 * | 3/2008 | Maione | A47C 7/70 297/161 |
| 2008/0164395 | A1 * | 7/2008 | Chang | F16M 11/04 248/276.1 |
| 2011/0108698 | A1 * | 5/2011 | Chen | E05B 73/0082 248/553 |
| 2011/0303805 | A1 * | 12/2011 | Lau | F16M 11/126 248/125.8 |
| 2013/0161466 | A1 * | 6/2013 | Lau | F16M 13/02 248/288.11 |
| 2013/0292522 | A1 * | 11/2013 | Sears | A47B 21/0371 248/118 |
| 2014/0367137 | A1 * | 12/2014 | Leung | H02G 3/045 174/68.3 |

FOREIGN PATENT DOCUMENTS

| | | |
|---|---|---|
| KR | 1020120139317 | 12/2012 |
| KR | 1020130027150 | 3/2013 |
| KR | 10-1321016 | 10/2013 |

* cited by examiner

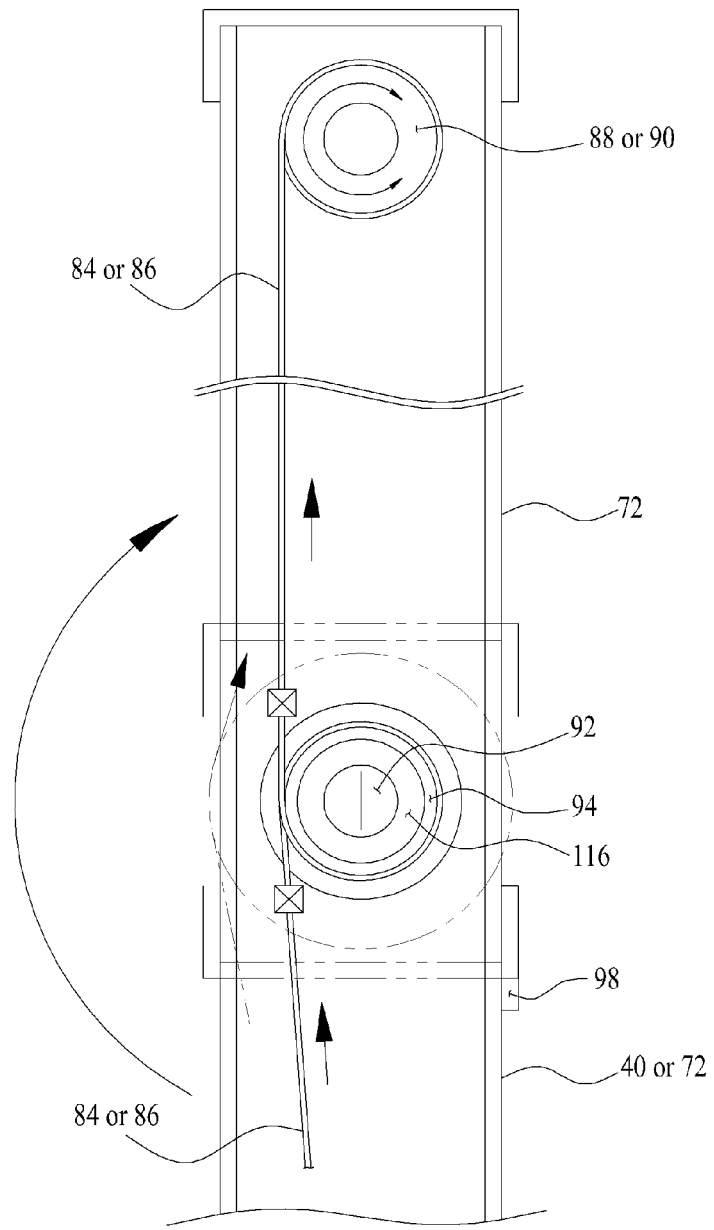

ARTICULATION TYPE SUPPORTER

CROSS-REFERENCE TO RELATED APPLICATIONS

This application claims priority to Korean Patent Application No. 10-2013-0168362, filed Dec. 31, 2013 and Korean Patent Application No. 10-2014-0044690, filed Apr. 15, 2014 the entireties of which are incorporated herein by reference.

FIELD OF THE INVENTION

The present invention relates to an articulation type supporter, and in particular to an articulation type supporter which is characterized in that when supporting a predetermined item from a fixed position to a distant position, it is possible to stably support the item since the supporter is formed of multiple joints even in case of any change in the weight of the item which will be supported, and the supporting distance.

BACKGROUND OF THE INVENTION

Since a portable electronic device such as a tablet PC, etc. is advantageous in that it is light and portable and is equipped with a variety of functions such as a function for watching videos irrespective of places, a function for viewing e-books, a function for making documents, a function for communication, etc., the use of such a portable electronic device continues to increase.

Even though the item such as a portable electronic device, a book, etc. is light, it is hard for a user to use while carrying it with for a long time. When using the item, it makes the user's hands uneasy. When the user needs to use both hands, it becomes harder to support the item.

For example, when the user needs to use a portable electronic device without using any supporter while lying in a bed or sitting in a chair without a table attached like in a vehicle, a train, etc., the user holds the portable electronic device with one hand, with the other hand handling with it, which makes the hands of the user uneasy and limited for another action.

To improve the above-mentioned problems, the Korean Patent Registration No. 1321016 (hereinafter referred to as "Prior Art") discloses a configuration wherein there are provided a plurality of link members forming an articulated structure, and the installation position of the portable electronic device may be adjusted by folding the link members.

The prior art however has a problem in that in case where the link members are arranged long, the end member of the link members should be bulkier in terms of the configuration of the link members because it is hard to withstand the weight of the portable electronic device.

The arranging length of the link members as mentioned above is limited because it is related with the weight of the item.

BRIEF DESCRIPTION OF DRAWINGS

FIGS. 6A and 6B are schematic cross sectional views illustrating on the plane the operational interrelationship of each component forming the second hinge connection unit of FIG. 5.

DETAILED DESCRIPTION OF THE INVENTION

Figure 1A:
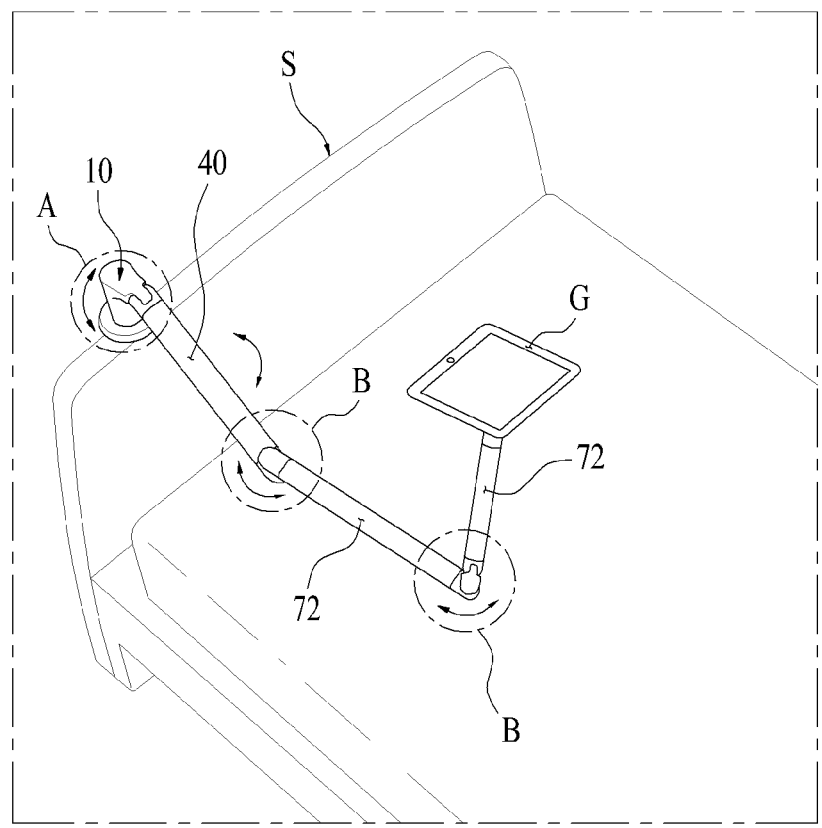
FIGS. 1A and 1B are perspective views illustrating an adopted relationship of an articulation type supporter according to an exemplary embodiment of the present invention.

Accordingly, the present invention is made in an effort to improve the above-mentioned problems.

It is an object of the present invention to provide an articulation type supporter which is characterized in that it is possible to stably support an item such as a book, a portable device, etc. without any limit in the distance to a fixed structure, and a rotational motion in upward and downward directions against a user's handling or an operation from a physical force, a swivel motion in the horizontal direction and a folding transformation due to such motions are easy.

To achieve the above object, there is provided an articulation type supporter, comprising a base frame which is rotatably installed at a structure; a movable frame of which one end is connected to the base frame and a first hinge connection unit, and the other end rotates by receiving a guide of the first hinge connection unit; and a plurality of connection frames which are in series connected through a portion of the other end of the movable frame and a plurality of second hinge connection units which are arranged with a predetermined interval from the portion of the other end of the movable frame, wherein a supported is connected to the connection frames so as to mount a predetermined item on the top of an end portion of the last position, and the first hinge connection unit includes a brake unit which enables a free upward rotation motion of the movable frame and is configured to provide pressure in order for a downward rotation motion of the movable frame to be performed with respect to a previously set weight which is applied from the other end of the movable frame.

In addition, the first hinge connection unit comprises a hinge hub which is disposed at the base frame and forms an opening in the direction of one side; a horizontal hinge shaft which is rotatably supported since a boss shape protruding from one end of the movable frame to the other side is inserted inside of the hinge hub and includes a slit which passes through the inner and outer sides at a part of the section of the surrounding of the side wall; and the brake unit, and wherein the brake unit comprises a first brake unit comprising a central shaft which is installed passing through the base frame and the movable frame through the center of the horizontal hinge shaft; a fixing unit part which is configured to prevent the separation of the movable frame with respect to the base frame through both ends of the central shaft; a first ratchet wheel which is configured to prevent rotation at the central shaft corresponding to the slit; a first pole of which one end is hinge-connected to the base frame or an inner side of the hinge hub, and the other end elastically rotates by a first elastic member and is tooth-engaged with the first ratchet wheel through the slit when the other end of the movable frame rotates downward; and a first pressing unit part which is installed at the central shaft and provides pressure to both sides of the movable frame based on the support of the base frame.

In addition, the first hinge connection unit comprises a central shaft which is installed passing through the base frame and the movable frame; a fixing unit part which is configured to prevent separation of the movable frame with respect to the base frame through both ends of the central shaft; and the brake unit, and wherein the brake unit comprises a third brake unit, including a bearing clutch which is engaged at the movable frame through which the central shaft passes; a bush which is rotatably installed at the central shaft and has an outer circumferential surface in a shape of a steel pipe having a flange unit at the other side is correspondingly inserted into the bearing clutch; and a pressing member which is installed at the central shaft and provides pressure to the flange unit of the bush based on the support of the base frame. In addition, the displacement adjusting unit comprises a first tensile member of which one end is fixed at the other end of the brake shoe and the other end is guided to its inner side based on a support at one end of the guide groove; a first buffer member which is installed inside of the guide groove and of which one end is connected to the other end of the first tensile member and is elastically contractible; and a second tensile member of which one end is fixed at the other end of the first buffer member, and the intermediate portion is wound one or more than one time sequentially around the second hinge connection unit, and the other end is fixed at a portion of the other end of the connection frame of the last end.

Meanwhile, the second hinge connection unit comprises a second pressing unit part which is configured to press for preventing the connection frames interposed based on the engaging position in the direction of the center at both ends of the vertical hinge shaft from estranging from each other in the longitudinal direction of the vertical hinge shaft. In addition, at each of the connection frames which are rotatably connected to each other about the second hinge connection unit, there is provided a stopping unit which is configured to regulate the rotations of the same with respect to the vertical hinge shaft. In addition, the stopping unit comprises a second ratchet wheel which is fixed at the top or bottom of the vertical hinge shaft; a second pole of which one end is tooth-engaged with the second latch wheel; a first bracket which is configured to fix the other end of the second pole; a rack which enables the installation of the first bracket; a guide rail which is installed at an inner wall of the connection frame and guides the rack to slide along the longitudinal direction of the connection frame; a lever of which one end is hinge-connected to a portion of the other end of the connection frame positioned at the last end, the intermediate portion protrudes from the inside through the side portion of the corresponding connection frame, and the other end is connected through a link to the rack; and a push bar which is provided inside of the connection frame and provides an elastic force in order for the lever to protrude from the side portion of the corresponding connection frame.

Meanwhile, the movable frame forms, at a portion of one end, a third through hole through which the central shaft passes, and the horizontal hinge shaft forms at one side a fourth through hole through which the central shaft passes and forms, from a portion of the center to the other side, a fifth through hole formed in a shape more expanded than the fourth through hole and having an inner diameter than the outer diameter of the first ratchet wheel, and the slit is formed at the side wall of the fifth through hole corresponding to the first ratchet wheel, wherein its outer circumferential surface is rotatably supported since the outer circumferential surface is inserted through the opening of the hinge hub, and the engagement of the horizontal hinge shaft with respect to the other side surface of the movable frame is performed in such a way that engaging bolts arranged at regular intervals on the concentric circle about the third and fourth through holes pass through one side of the movable frame and are engaged with the horizontal hinge shaft.

In addition, one end of the first connection frame among the connection frames is rotatable in the horizontal direction about the second hinge connection unit and is connected to the other end of the movable frame in such a way that one end of the first connection frame may be folded or estranged with respect to the movable frame based on the position of the rotation, and the remaining connection frames are in series connected in a connection way of the first connection frame with respect to the other end of the movable frame through the second hinge connection unit, and a first installation groove of which an inner diameter is further expanded is formed in least one circumferential surface in the third and fourth through holes which contact with each other, and the movable frame forms a guide groove of which one end communicates with the first installation groove, and the other end extends to the other end of the movable frame, and the second brake unit is installed inside of the first installation groove, and in the guide groove, there is provided a displacement adjusting unit of which one end is connected to the second brake unit, and the other end is connected to the connection frames based on an in-series connection through one or more than one second hinge connection unit, for thereby adjusting a braking performance of the second brake unit based on the arrangements of the connection frames including the movable frame.

In addition, the second brake unit comprises a brake shoe of which one end is hinged at a portion of the direction of one end of the movable frame in the first installation groove, and the intermediate portion is shaped to have an area contact at the outer circumferential surface of the central shaft in response to the rotation position, and the other end is connected to the displacement adjusting unit; and a return elastic member which is installed at an inner wall of the first installation groove and provides an elastic force for the brake shoe to be estranged from the central shaft.

In addition, the displacement adjusting unit comprises a first tensile member of which one end is fixed at the other end of the brake shoe and the other end is guided to its inner side based on a support at one end of the guide groove; a first buffer member which is installed inside of the guide groove and of which one end is connected to the other end of the first tensile member and is elastically contractible; and a second tensile member of which one end is fixed at the other end of the first buffer member, and the intermediate portion is wound one or more than one time sequentially around the second hinge connection unit, and the other end is fixed at a portion of the other end of the connection frame of the last end.

In addition, the displacement adjusting unit comprises a wide or band-shaped third tensile member of which one end is fixed at the other end of the brake shoe, the intermediate portion is guided from one end of the guide groove and is wound one or more than one time around the second hinge connection unit, and the other end is connected to the other end of the connection frame; and a winding unit which is installed at the other end of the last connection frame for thereby elastically fixing and winding the other end of the third tensile member.

Along with this, the second hinge connection unit includes a vertical hinge shaft which is installed passing through a portion where the other end and one end of each of the neighboring connection frames are overlapped; and a roller which is rotation-free on the vertical hinge shaft in a cylinder shape surrounding the vertical hinge shaft, and wherein the first, second and third tensile members are connected in series from one side to the other side among the connection frames which are wound by the roller and are connected by the second hinge connection unit.

Advantageous Effects

According to the present invention, the spatial use of an item including a portable device is stable and convenient in a posture that a user wants because the base frame is stably fixed at a previously installed structure such as a bed, a chair, a bookshelf, etc., and the movable frame connected through a horizontal hinge shaft is configured to withstand the weight of the portable device with the aid of a tooth-engaged relationship of a first ratchet wheel and a first pole or a braking force of a first pressing unit part against a central shaft by a bearing clutch, and when a force is applied from the user in the direction where the weight is applied, the rotational motions in the upward and downward directions are free.

In case where the item which will be supported is an electronic device, the electric power cable is arranged along the inner sides of the base frame, the movable frame and a plurality of connection frames, the management of the cables is easy, and the use thereof is convenient.

In response to the operation where the installation position of the item is separated from the base frame, the braking force against the sagging of the movable frame by the displacement control unit besides the first and second brake units or the second and third brake units increases, the installation and use of the item becomes more stable.

MODE FOR INVENTION

The terms or words used throughout the specification and claims should not be limitedly interpreted based on the typical meaning or the meaning of the dictionary, but should be interpreted as the meaning and concept which may well match with the technical concept of the present invention based on the principle where the inventor himself may properly define the concepts of the terms so as to describe his invention in the best way.

In addition, since the configuration of the embodiment recited in the present specification and the drawing are just the exemplary embodiments of the present invention, not presenting all the technical concepts of the present invention, it should be interpreted that there may be a variety of equivalents and modifications which may substitute the present invention at the time the present invention is filed.

In the course of the description of the first hinge connection unit of the present invention, the terms of "one side" and "the other side" should be interpreted in such a way that the direction where the movable frame is placed is referred to as one side based on any one criteria portion "S" of the base frame, and the opponent side is referred to as the other side. As for the terms on the end portion with respect to the configuration which includes a predetermined length including the connected relationship of the movable frame and the connection frame, the direction of the first hinge connection unit in the whole configuration is referred to as one end, and the opponent side is referred to as the other end, and the detailed description thereof will be omitted.

The exemplary embodiment of the present invention will be described with reference to the accompanying drawings.

Figure 1B:
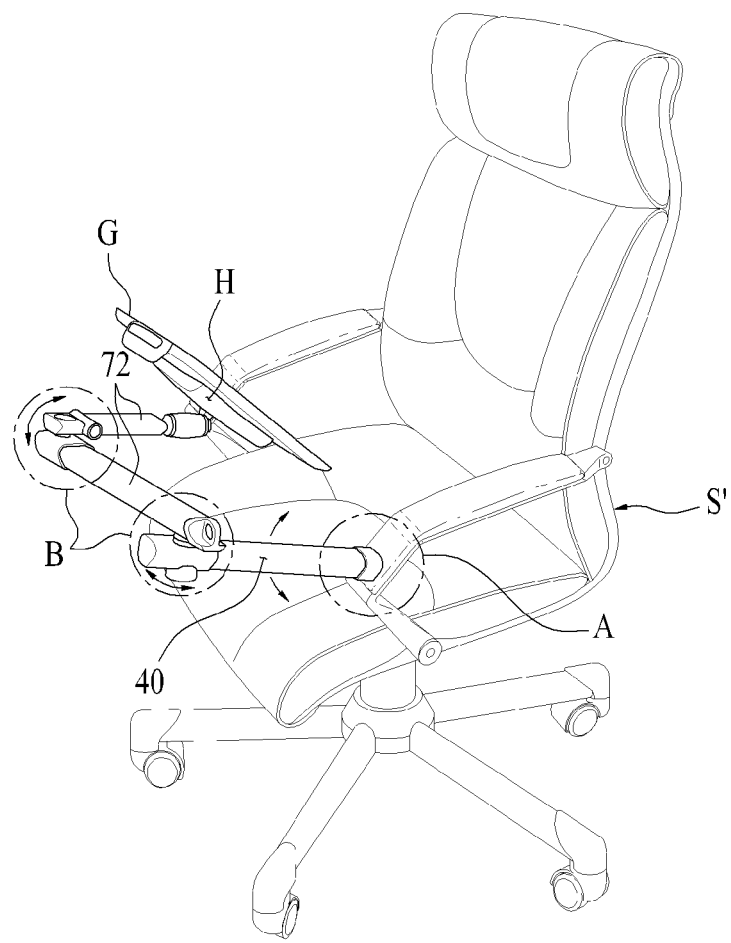

The articulation type supporter according to the exemplary embodiment of the present invention, as illustrated in FIG. 1A or 1B, includes a base frame 10 which is fixedly installed at a structures "S" and "S'" such as a bed, a chair or a bookshelf, etc. in a typical way.

In addition, the base frame 10 is configured to rotate when a previously set force (for example 20~50N) is applied from a user in a state where the base frame 10 is fixedly installed at the structures "S" and "S'".

As illustrated in FIGS. 2 to 15, the base frame 10 includes movable frames 40, 40' and 40" wherein one end of each of the movable frames 40, 40' and 40" is connected through the first hinge connection units "A" and "A'", and the other end of each of the movable frames 40, 40' and 40" is rotational toward the centers thereof, and connection frames 72 which are continuously connected from the other ends of the movable frames 40, 40' and 40" to a second hinge connection unit "B" and the other end of each of which is rotational in the horizontal direction about the second hinge connection unit "B".

In addition, a supporter "H" where the item "G" such as a portable electronic device, etc. is installed, is provided at the other end of the final connection frame 72, and the base frame 10, the movable frame 40 and a plurality of the connection frames 72 are formed of multiple joints in a form of multiple stages which may be bent about the first and second hinge connection units "A" and "B" in order for the item "G" to be placed at a portion where the user wants besides the posture of the user.

Here, the second hinge connection unit "B" may be described as allowing a plurality of connection frames 72 including the movable frame 40 to extend long from the base frame 10 or other connection frames 72 including the movable frame 40 to be folded on the top or bottom of each of the other connection frames 72, but it is obvious that a first hinge connection unit "A" may be alternatively installed between the connection frames 72, instead of the second hinge connection unit "B".

In the course of the description of the articulation type supporter of the present invention, each component forming the present invention and the assembled relationship of the components will be described in detail with each exemplary embodiment with respect to the first hinge connection unit "A".

Exemplary Embodiment 1

Figure 2:
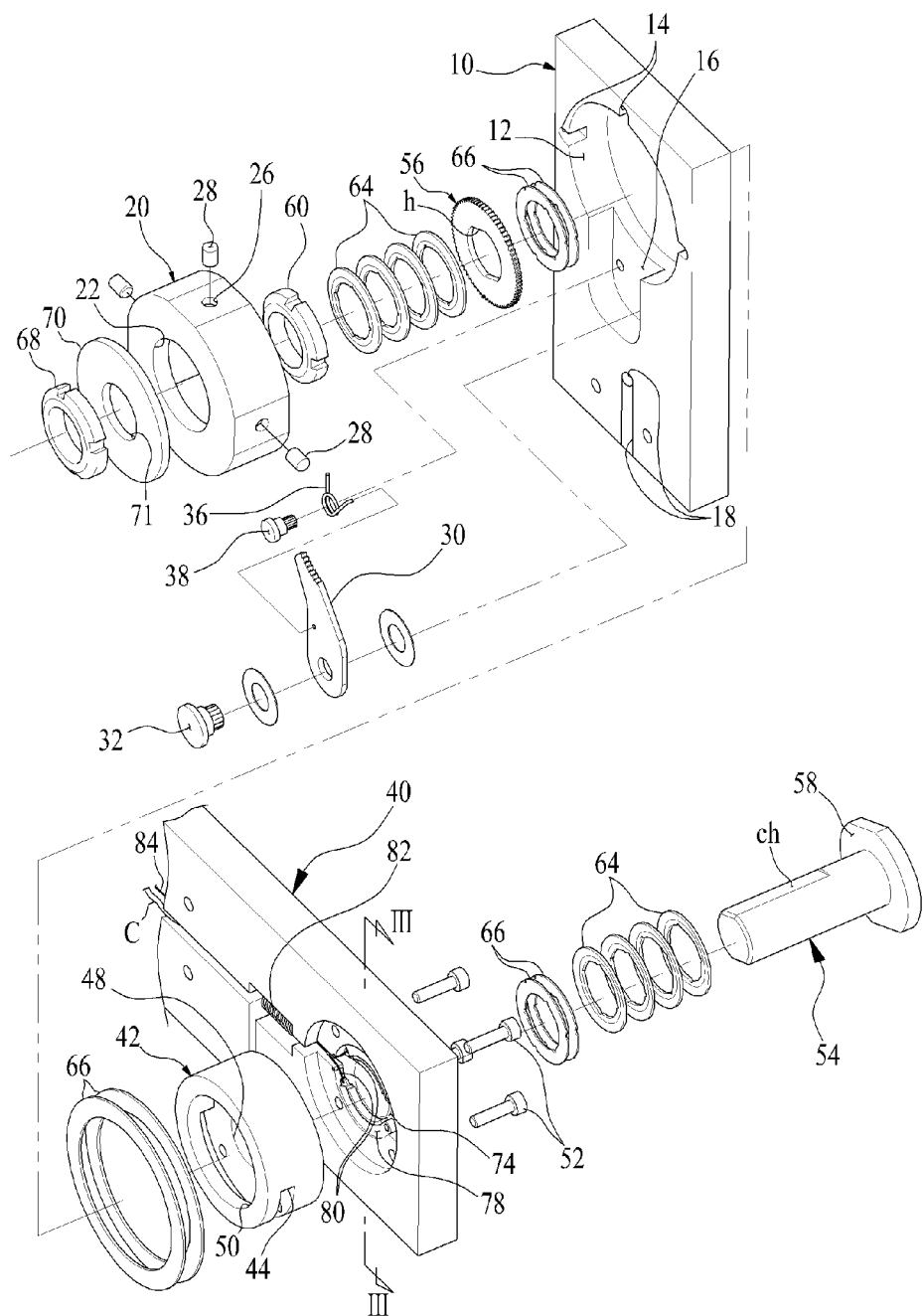
FIG. 2 is a schematic disassembled perspective view for describing a configuration of a first hinge connection unit and an assembled relationship of the configuration according to a first exemplary embodiment of the present invention in FIG. 1A.

First, the base frame 10 according to the first exemplary embodiment of the present invention as illustrated in FIG. 2 is characterized in that an assembly hole 12 passing through from one side to the other side is formed at a central portion of one end, and at least one first pin groove 14 with a previously set width and depth is formed near the assembly hole 12 and from the other side to one side along the surrounding portions of the assembly hole 12.

In addition, the base frame 10 includes an engaging groove 16 contacting with the assembling hole 12 at one side surface between both side surfaces. A groove or a groove-shaped cable passage 18 is further formed inside of the base frame 10 or at a portion selected from both the side surfaces in order to guide the installation of the electric power cable "C".

Figure 3:
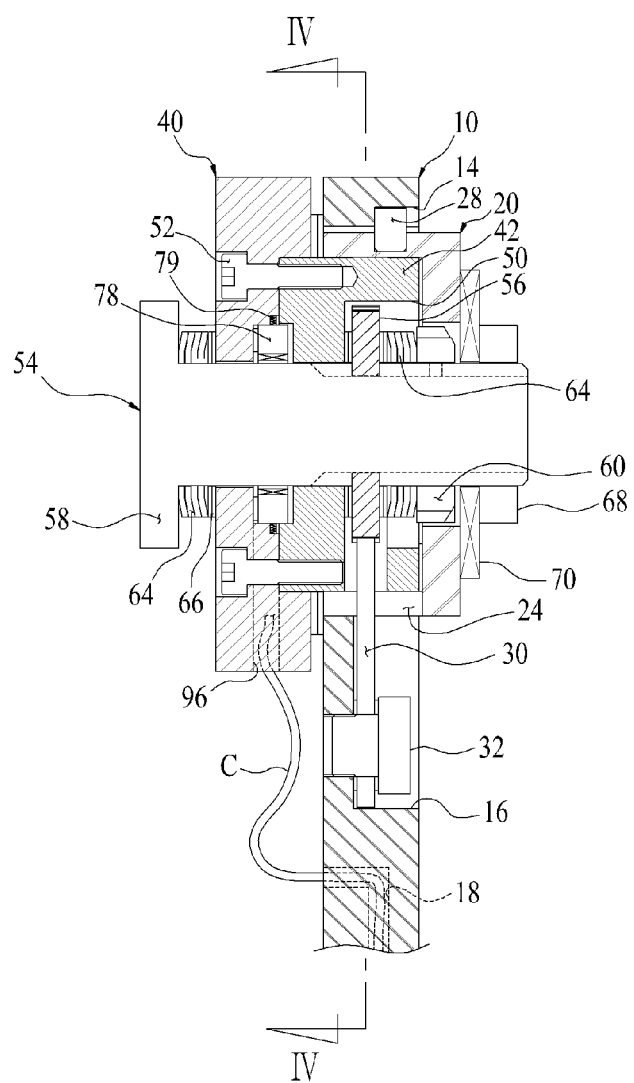
FIG. 3 is a schematic cross sectional view for describing an assembled relationship of each component and the operational relationship thereof based on the arrow line III-III of FIG. 2.

The assembly hole 12 as illustrated in FIGS. 2 and 3 is configured in such a way that a cap-shaped hinge hub 20 having an opening at one side thereof is inserted from the other side to one side of the assembly hole 12, and the hinge hub 20 includes a first through hole 22 passing through in the direction of the opening at the central portion of the direction of the other side.

The surrounding of the inner wall of the hinge hub 20 and the first through hole 22 are concentric with the central shaft 54.

Figure 4A:
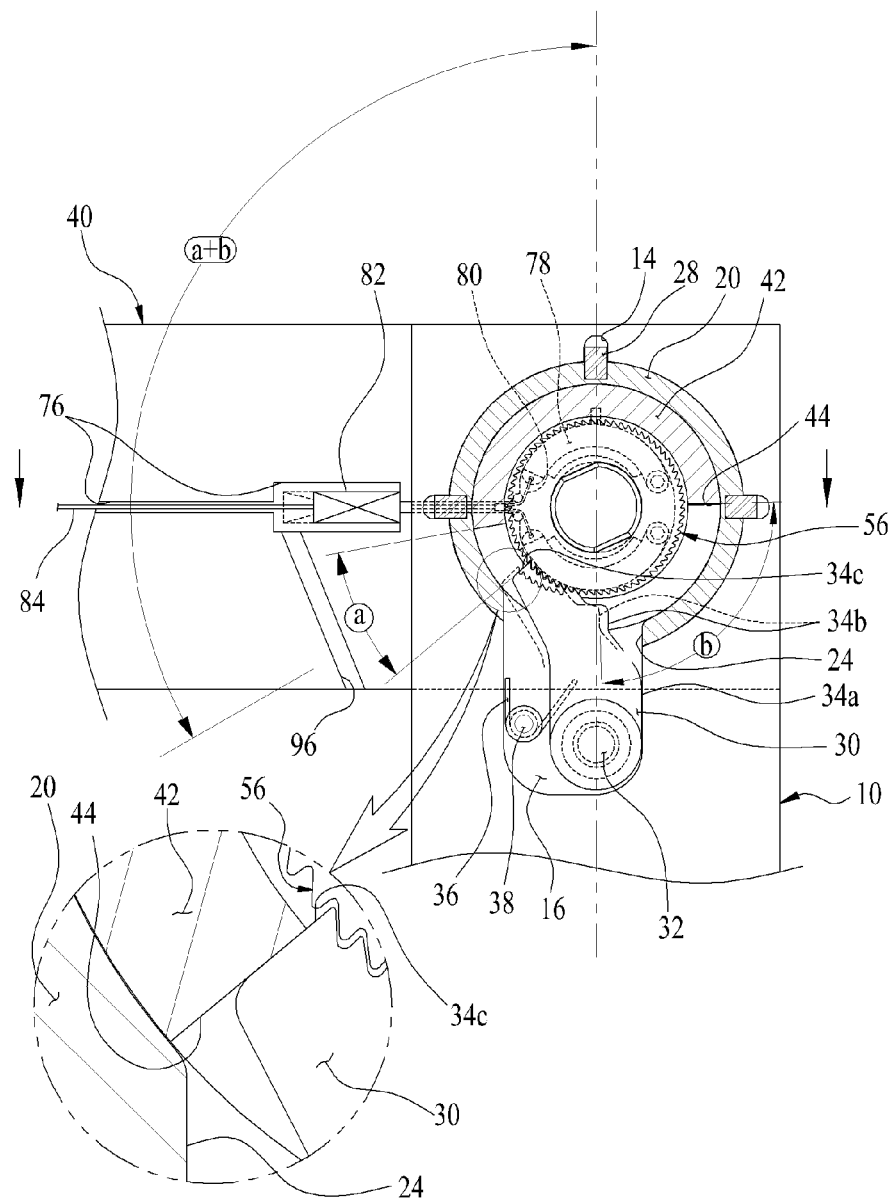
FIGS. 4A and 4B are schematic cross sectional views for describing an assembled relationship of a corresponding component and the operational relationship thereof based on the arrow line IV-IV of FIG. 3.
Figure 4B:
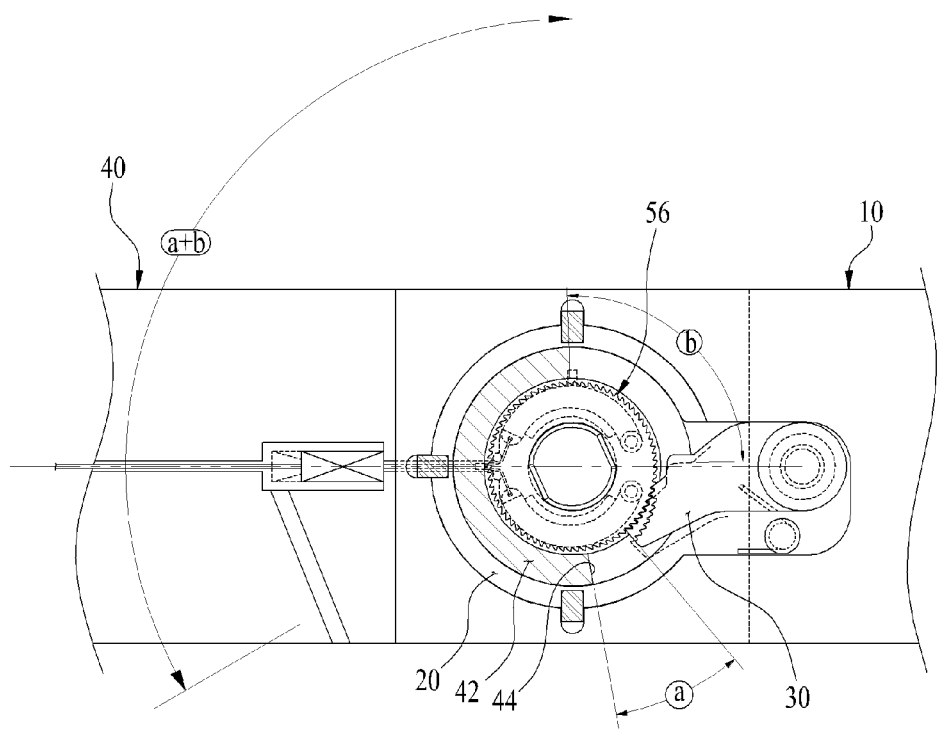
Figure 11:
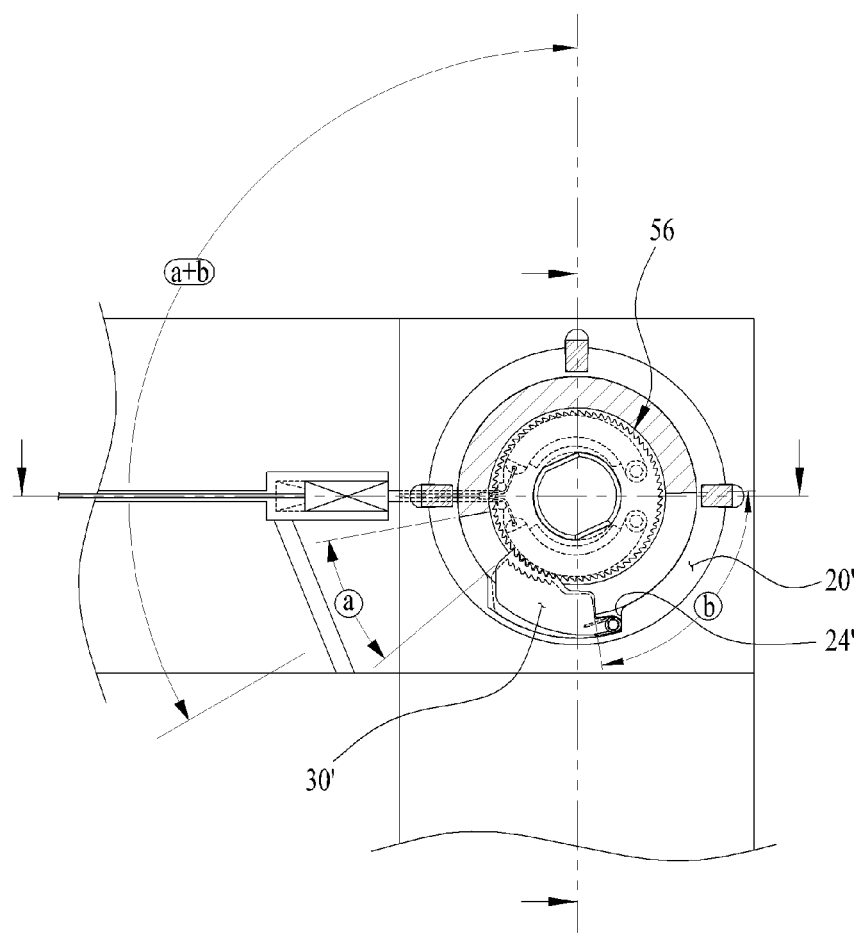

The hinge hub 20 as illustrated in FIGS. 4A and 4B may form a cut-shaped cutting unit 24 which is cut so that a portion corresponding to the engaging groove 16 passes through the inside and outside portions based on the previously set design in the surrounding of the side wall or as illustrated in FIG. 11, may form a cutting unit 24' having a concave depth from the inner wall to the outer side.

The hinge hub 20 forms a second pin groove 26, which has a depth in the direction from the outside to the center, on the outer circumferential surface corresponding to the first pin groove 14.

An end portion of a divide pin 28 configured to have an engaging relationship is inserted into the second pin groove 26.

The divide pin 28 is engaged with and inserted into a first pin groove 14 while the other end portion protruding from the outer circumferential surface of the hinge hub 20 enables the hinge hub 20 to be inserted against the assembly hole 12, by means of which the divide pin 28 limits the insertion depth of the hinge hub 20 with respect to the base frame 10 and at the same time performs the rotation prevention and aligning function of the hinge hub 20 with respect to the base frame 10.

Since the rotation of the portion of one side of the hinge hub 20 may be prevented since the divide pin 28 overlaps at the depth of the first pin groove 14, and the protrusion from one side surface of the base frame 10 is determined based on the previously set design position, and the tolerance of the divide pin 28 with respect to the first pin groove 14 corresponds to the allowance relationship when installing the hinge hub 20 at the base frame 10.

In addition, the hinge hub 20 may be integrally formed with respect to the base frame 10. The reason why it is designed in the structure for assembling the hinge hub 20 with respect to the base frame 10 is that any convenience in the assembly relationship of other components and the management such as the adjustment of the pressing of the pressing member 60 can be improved.

Of course, the divide pin 28 may be integrally formed with respect to the side wall of the hinge hub 20.

As illustrated in FIGS. 4A and 4B, the cutting unit 24 of the hinge hub 20 is arranged in response to the engaging groove 16, and in the engaging groove 16, one end of the first pole 30 is hinged through the first hinge pin 32 to the base frame 10.

The other end of the first pole 30 is positioned through the cutting unit 24 and at the inner side of the hinge hub 20, the shape of which is a tooth shape where it is engaged with the first ratchet wheel 56 based on the rotation position about the first hinge pin 32.

As illustrated in FIGS. 4A and 4B, a side portion of one side in an end portion of the first pole 30 has a first rotation angle support unit 34a which is supported by the inner wall of one side of the engaging groove 16 when being engaged to prevent the rotation of the first ratchet wheel 56.

In addition, a side portion of one side in the other end of the first pole 30, as illustrated by the dotted line in FIGS. 4A and 4B, has a second rotation angle support unit 34b which supports the rotations of a side portion of one side in the longitudinal direction of the slit 44 which will be described later.

In addition, an end portion of the opposite side in the other end of the first pole 30, as illustrated in the enlarged view of FIG. 4A, forms a third rotation angle support unit 34c which supports the rotations of the side portion of the opposite side in the longitudinal direction of the slit 44.

The range of the rotational angle of the movable frame 40, as illustrated in FIG. 4A, is within an angle range of the sum of the rotational angle ⓑ until the side portion of one side of the longitudinal direction of the slit 44 formed at the horizontal hinge shaft 42 becomes supported by the second rotational angle support unit 34b of the first pole 30 and the rotational angle ⓐ until the side portion of the opponent side of the longitudinal direction of the slit 44 becomes supported by the third rotational angle support unit 34c of the first pole 30.

In the engaging groove 16, a first elastic member 36 is installed by the second hinge pin 38 in such a way that one end is supported by the side wall or the bottom of the engaging groove 16, and the other end provides the elastic force for the first pole 30 and the first ratchet wheel 56 to be engaged with each other.

As illustrated in FIGS. 2 and 4A and 4B, the first elastic member 36 is illustrated to be a coil spring and is installed by the second hinge pin 38, however such configuration is not limited thereto. As far as the elastic force may be supplied to rotate the other end of the first pole 30, various type of the first elastic member including a leaf spring or a rubber may be adopted.

In addition, it is obvious to a person having ordinary skill in the art that the first elastic member 36 may be installed together with the first pole 30 through the first hinge pin 32 which is used to fix the first pole 30.

With regard to the installation of the first pole 30, as illustrated in FIG. 11, the engaging groove 16 may be omitted, and in terms of its formation direction, different from the expression in FIGS. 2 and 3, it may be formed with a predetermined depth in the thickness wise direction from one side surface of the base frame 10.

The movable frame 40 includes a horizontal hinge shaft 42 which protrudes, in a boss shape, from the other side surface of one end. The horizontal hinge shaft 42 is inserted through the opening of the hinge hub 20 and into the interior in the direction from one side to the other side for thereby rotatably being supported together with the movable frame 40.

In addition, the horizontal hinge shaft 42 includes a cut-away shape slit 44 in order for a partial section of the surrounding direction in the outer circumferential surface to pass through the inner and outer sides.

The horizontal hinge shaft 42 may be manufactured in a shape integrally protruding from the other side surface of the movable frame 40. Hereinafter, that the horizontal hinge shaft 42 is selectively engaged with respect to the other side surface of the movable frame 40 will be described.

First, as illustrated in FIG. 2, a third through hole 46 is formed at an end portion of the movable frame 40 in order for the central shaft 54 to pass through the third through hole 46. A fourth through hole 48 is formed at one side of the horizontal hinge shaft 42 in a straight line arrangement with respect to the third through hole 46.

In addition, the section from the central portion in the longitudinal direction of the horizontal hinge shaft 42 to the other side forms a fifth through hole 50 in a shape more expanded than the fourth through hole 48 wherein the fifth through hole 50 has an inner diameter larger than the outer diameter of the first ratchet wheel 56.

The formation position of the slit 44 is at the side wall of the formation region of the fifth through hole 50 while corresponding to the position where the first latch wheel 56 is placed based on the previously set design position.

In addition, the engagement of the horizontal hinge shaft 42 with respect to the movable frame 40, as illustrated in FIG. 2, is made by the engaging bolts 52 which are engaged to the movable frame 40 at interval angles on the concentric circle about the third through hole 46 from one side.

At this time, the rotation of the horizontal hinge shaft 42 with respect to the hinge hub 20 is made within the range of the rotational angle (ⓐ+ⓑ) between the second and third rotational angle support units 34b and 34c of the first pole 30 to which the side portions of both sides of the longitudinal direction of the slit 44 correspond.

For this reason, the regular angle arrangement on the concentric circle of the engaging bolts 52 is made in an effort to adjust the arrangement angle of the rotational angle (ⓐ+ⓑ) based on the assembly of the movable frame 40 with respect to the base frame 10.

Namely, the horizontal hinge shaft 42 is engaged in a state where it is rotated by the measure of the angles based on the arrangement of the engaging bolt 52 with respect to the movable frame 40, and the arrangement of the slit 44 must be constant with respect to the base frame 10.

The rotation angle range of the movable frame 40, as illustrated in FIG. 4A, is formed over 2nd~3rd quadrants about the central shaft 54 of the base frame 10 which stands vertically, and as illustrated in FIG. 4B, the rotation angle range thereof is formed over 2nd to 3rd quadrants about the central shaft 54 of the base frame 10 which stands horizontally, so the rotational angle range of the movable frame 40 should be determined in response to the installation direction of the base frame 10.

More specifically speaking, the formation direction of the slit 44 of the horizontal hinge shaft 42 is determined in such a way to rotate the horizontal hinge shaft 42 based on the regular angle arrangement on the concentric circle of the engaging bolts 52 with respect to the longitudinal direction of the movable frame 40 and to fix it using the engaging bolts 52.

In this way, the movable frame 40 becomes rotatable with respect to the base frame 10 since the horizontal hinge shaft 42 is inserted into the hinge hub 20, and at this time, the centers of the first, third, fourth and fifth through holes 22, 46, 48 and 50 and the center of second through hole 71 are on the straight line about the central shaft 54.

Figure 10:
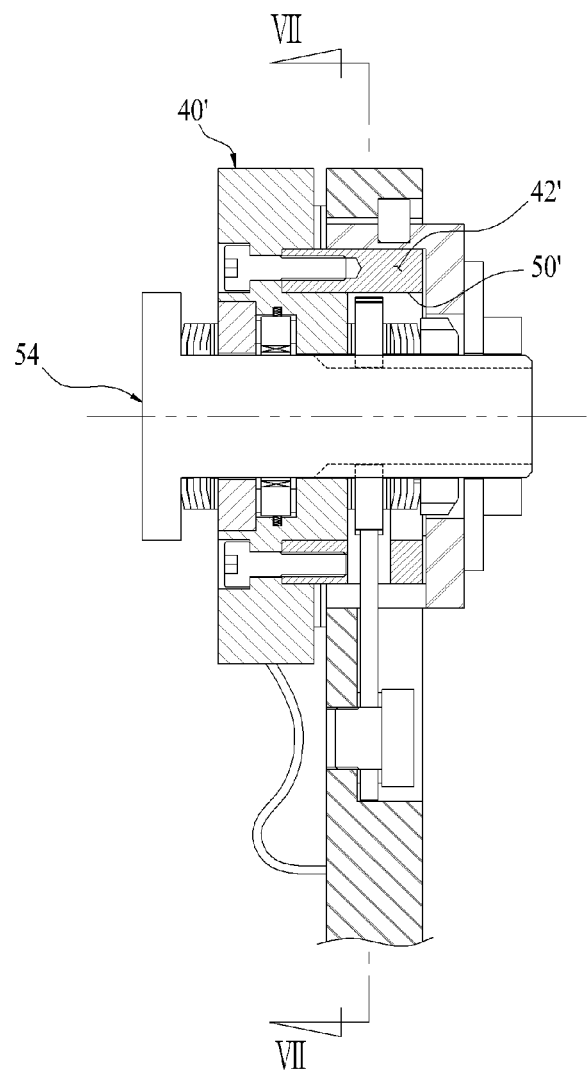

In the course of the description on the shape of the horizontal hinge shaft 42, the formation of the fourth through hole 48 may not be necessary, and as illustrated in FIG. 10, it may be formed in a tube shape wherein the inner diameter of the horizontal hinge shaft 42' is the dimension of the fifth through hole 50' and may be engaged to the corresponding movable frame 40'.

As mentioned in the above, the configuration formed of the hinge hub 20 belonging to the base frame 10 and the horizontal hinge shaft 42 belonging to the movable frame 40 forms a first hinge connection unit "A".

The first hinge connection unit "A" includes a brake unit configured to limit the downward rotations of the movable frame 40 in response to the weight of the previously set item "G" which is applied from the other end of the movable frame 40, and the brake unit allows the movable frame to rotate upward and downward with respect to the base frame 10 when the user's force is applied.

When the above brake unit is described more specifically, the brake unit of the first exemplary embodiment of the present invention is referred to as a first brake unit.

The above-mentioned first brake unit includes a central shaft 54 which is installed passing through the base frame 10 and the movable frame 40 through the first, third, fourth and fifth through holes 22, 46, 48 and 50 of one row arrangement.

The first brake unit includes a fixed unit part configured to prevent the movable frame 40 from separating against the base frame 10 through both ends of the central shaft 54, a first ratchet wheel 56 configured to prevent the rotations against the central shaft 54 on the central shaft 54 in the fifth through hole 50 corresponding to the slit 44, and a first pressing unit part which is engaged in the longitudinal direction to the first pole 30 and the central shaft 54 which receive the elastic force of the first elastic member 36 and presses both sides of the movable frame 40 based on the central shaft 54 in response to the engaging position.

The central shaft 54 in the configuration brake unit, as illustrated in FIGS. 2 and 3, includes a protrusion unit 58 which is formed in a shape protruding vertically with respect to the longitudinal direction at the surrounding of the outer surface formed at a portion deviated toward one side of the movable frame 40 over its length.

In the configuration wherein the central shaft 54 forms a protrusion 58 at a portion of one side, the first pressing unit part may be formed of a typical pressing member 60 which is engaged in the direction from the other end to one end of the central shaft 54 and is configured to press the other side of the movable frame 40 including the interposed horizontal hinge shaft 42 with the aid of the support of the protrusion 58.

As illustrated in FIG. 3, one type of the pressing member 60 may be formed of a fluted nut for fixing the corresponding thread engagement and position if the outer circumferential surface of the other end of the central shaft 54 is formed of male threads.

Another type of the pressing member 60 may be formed of a ring or a sleeve which may slide along the central shaft 54. The position of the ring or the sleeve against the central shaft 54 may be fixed using a fixing pin 62 in a state (the ring or the sleeve is pressurized in the direction of the protrusion 58) where the other end of the central shaft 54 is ejected from the ring or the sleeve based on the previously set pressure relationship using an ejecting member (not shown).

Figure 9:
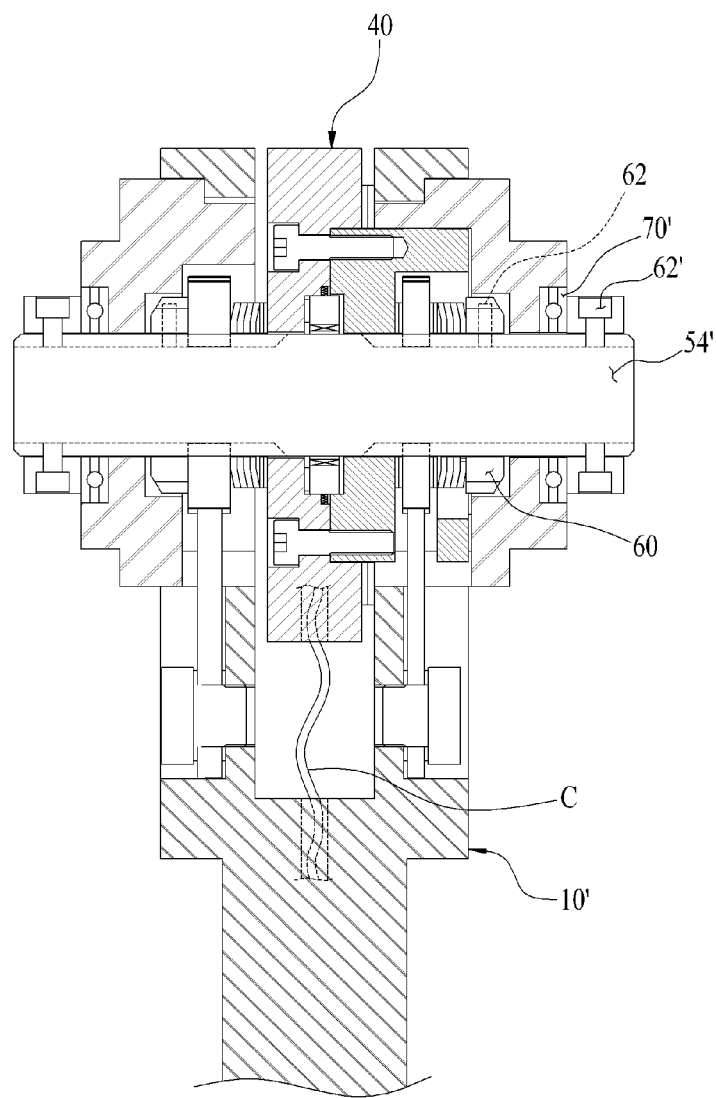
FIGS. 9 to 11 are cross sectional views illustrating a modified exemplary embodiment of the present invention.

In addition, the first pressing unit, as illustrated in FIG. 9, includes a pressing member 60 which is configured to allow one side and the other side of the movable frame 40 to be engaged at both ends of the central shaft 54' in the pressed state wherein the movable frame 40 includes the interposed horizontal hinge shaft 42.

In addition, the engagement of the pressing member 60 against the central shaft 54, as illustrated in FIGS. 3, 9 and 10, enables the first ratchet wheel 56 to be aligned at the previously set design position against the slit 44 of the horizontal hinge shaft 42.

As for the installation of the first ratchet wheel 56 against the central shaft 54, as illustrated in FIG. 2, a chamfered portion "ch" is formed by chamfering a side surface of the central shaft 54 from the end portion of the central shaft 54 to where the first ratchet wheel 56 is placed based on the previous setting or by forming a key groove, and an insertion hole "h" shaped in response to the shape of the cross section of the central shaft 54 including the chamfered portion "ch" is formed at the center of the corresponding first ratchet wheel 56. In terms of the engaging relationship in the direction of the surrounding of the central shaft 54, the rotations in the direction thereof between them may be prevented.

As illustrated in FIGS. 3 and 10, in order to elastically support the interval between the corresponding components against the pressure due to the engagement of the pressing member 60, it is preferred that at least one disk spring 64 is interposed at the central shaft 54 between one side surface of the movable frame 40 and the protrusion 58 facing the same, between the other side surface of the movable frame 40 including the horizontal hinge shaft 42 and the ratchet wheel 56 facing the same, and between one side surface or the other side surface of the movable frame 40 including the horizontal hinge shaft 42 as illustrated in FIG. 9 and the ratchet wheel 56 facing the same.

The thusly installed disk spring 64 presses and supports, in the way of the pressing relationship, the movable frame 40 including the horizontal hinge shaft 42 using the pressure thanks to the engagement of the pressing member 60 about the central shaft 54 used as the supporting basis, so that the pressure generating thanks to the engagement of the pressing member 60 may be adjusted with elastic force.

As illustrated in FIGS. 3 and 10, it is preferred that there is further provided a pair of opposite washer members 66 between the configurations wherein a predetermined configuration facing each other in the longitudinal direction of the central shaft 54 is rotatable from another configuration which has an area contact relationship, wherein the configuration includes a portion interposed between one side surface of the movable frame 40 and the disk spring 64 facing the same, a portion interposed between the other side surface of the movable frame 40 including the horizontal hinge shaft 42 and the disk spring 64 facing the same, a portion interposed between one side surface of the base frame 10 and an end portion of one side of the hinge hub 20 or as illustrated in FIG. 9 a portion interposed between one side surface or the other side surface of the movable frame including the horizontal hinge shaft and the disk spring facing 64 the same and a portion interposed between the movable frame 40 including the horizontal hinge shaft 42 and the first ratchet wheel 56 facing the same.

In addition, the washing members 66, as described above, is characterized in that the opposite surfaces formed in pair are formed of flat surfaces which are slidable against each other, and the washing members 66 are made from a material having a wear resistance and durability.

Namely, the washing members 66 have an inter-pressing relationship since elastic force is supplied through the disk spring 64 and are formed at a portion where a predetermined configuration among the opposite configurations is rotatable while being slidable from another configuration for thereby performing the function of a flat washer which has a friction relationship instead between them.

Meanwhile, the fixed unit part forming the first hinge connection unit "A" may be formed of a nut 68 which is engaged in a state where it approaches the other side surface of the base frame 10 including the hinge hub 20 in a state where one side of the movable frame 40 is supported by the protrusion 58 or the pressing member 60.

As illustrated in FIGS. 2, 3 and 9, the nut 68 may be formed of a fluted nut including the fixing pin 62 like in the description of the pressing member 60.

As for another type of the nut 68, it is formed in a shape of a ring or a sleeve which is slidable along the central shaft 54. In a state where the portion of one side of the ring or the sleeve is in proximity to the other side surface of the base frame 10 including the hinge hub 20 through the other end of the central shaft 54, the position of the ring or the sleeve against the central shaft 54 may be fixed using the fixing pin 62.

In addition, a second through hole 71 through which the portion of the other end of the central shaft 54 passes is formed between the other side surface of the hinge hub 20 or the other side surface of the base frame 10 and the nut 68. There may be further provided a support member 70 which plays a role of the area contact between them.

Namely, the nut 68 is fixed at the central shaft 54 and is configured to rotate in one direction together with the central shaft 54, and the base frame 10 including the hinge hub 20 is configured to be in the stop state. The support member 70 installed between them plays a role of the interference based on the contacts between them.

The support member 70 may be formed of the washer member 66 or like the support member 70' as illustrated in FIG. 9, a trust bearing, etc. may be used so as to support the portion between the base frame 10 including the hinge hub 20 and the nut 68.

Therefore, the fixing unit performs a function of preventing the base frame 10 and the movable frame 40 from widening from each other or preventing any separation thereof between the protrusion 58 of one side of the movable frame 40 and the nut 68 and between the pressing member 60 of one side of the movable frame 40 and the nut 68.

The operation relationship will be described based on each configuration of the first hinge connection unit "A" according to the first exemplary embodiment of the present invention.

First, the movable frame 40 may be prevented from separating from the base frame 10 and at the same time is in the rotatable state thanks to the fixing unit part in a state where the horizontal hinge shaft 42 is inserted in the hinge hub 20.

In addition, the movable frame 40 is in a state where the rotation thereof is not free against the central shaft 54 since it is pressed by the first pressing unit part, and the central shaft 54 is prevented from rotating in one direction thanks to the first ratchet wheel 56 with respect to the first pole 30 and is free to rotate in the opposite direction.

As illustrated in FIG. 4A, the central shaft 54 does not rotate thanks to the engaged relationship with the first pole 30 with the respect to the direction to which the weight is applied from the other end of the movable frame 40.

At this time, the movable frame 40 does not rotate in the direction to which the weight is applied from the other end of the movable frame 40 by receiving the braking operation (the braking force of the pressure and friction relationship) with respect to the central shaft 54 and may rotate when the user applies force in excessive of the pressure of the first pressing unit part in the direction to which the weight is applied from the other end of the movable frame 40 and may maintain the stopped state with respect to the direction to which the weight is applied from the other end of the movable frame 40 in case where the user stops providing the force.

Here, the pressure of the first pressing unit part should be in the range of the previously set pressure in the course of the assembly of each component.

In addition, as illustrated in FIG. 4A, the central shaft 54 becomes a rotation-free state since the engagement with the first pole 30 is released with respect to the direction where the other end of the movable frame 40 is limited up, so the movable frame 40 becomes a rotation-free state with respect to the direction to which the weight is applied from the other end of the movable frame 40 about the hinge hub 20.

Exemplary Embodiment 2

As illustrated in FIGS. 12 to 15, the first hinge connection unit "A" according to the second exemplary embodiment of the present invention includes an assembly hole 12' which passes through from one side to the other side at the center of one end of the portion "S" which is the criteria in the base frame 10", and a key groove 130 is formed at a circumferential portion of the other side of the assembly hole 12' wherein the key groove is formed in a shape where a part of the inner diameter in the radial direction outwardly expands from the center of the assembly hole 12'.

In addition, the first hinge connection unit "A" includes a brake unit which provides a braking force for limiting the downward rotation of the movable frame 40" in response to the weight of the previously set item "G" which is applied from the other end of the movable frame 40", and in case where the user's force is applied, the brake unit allows the movable frame 40" to rotate upward and downward with respect to the base frame 10".

The brake unit according to the second exemplary embodiment of the present invention is referred to as a third brake unit. The third brake unit will be described in detail.

The movable frame 40" facing one side of the criteria portion "S" of the base frame 10" forms, at the center of its end, a sixth through hole 132 which is on the same axial line as the assembly hole 12', and a clutch bearing 140 is inserted inside of the sixth through hole 132 and is fixed by a typical engaging member "L" such as a bolt, etc.

In addition, a ring-shaped guard 142 is fixed at both ends of the sixth through hole 132 with the aid of a typical engaging member "L" such as a flat-headed screw so as to prevent the separation of the clutch bearing 140 in the direction of the hole formation of the sixth through hole 132.

Figure 12:
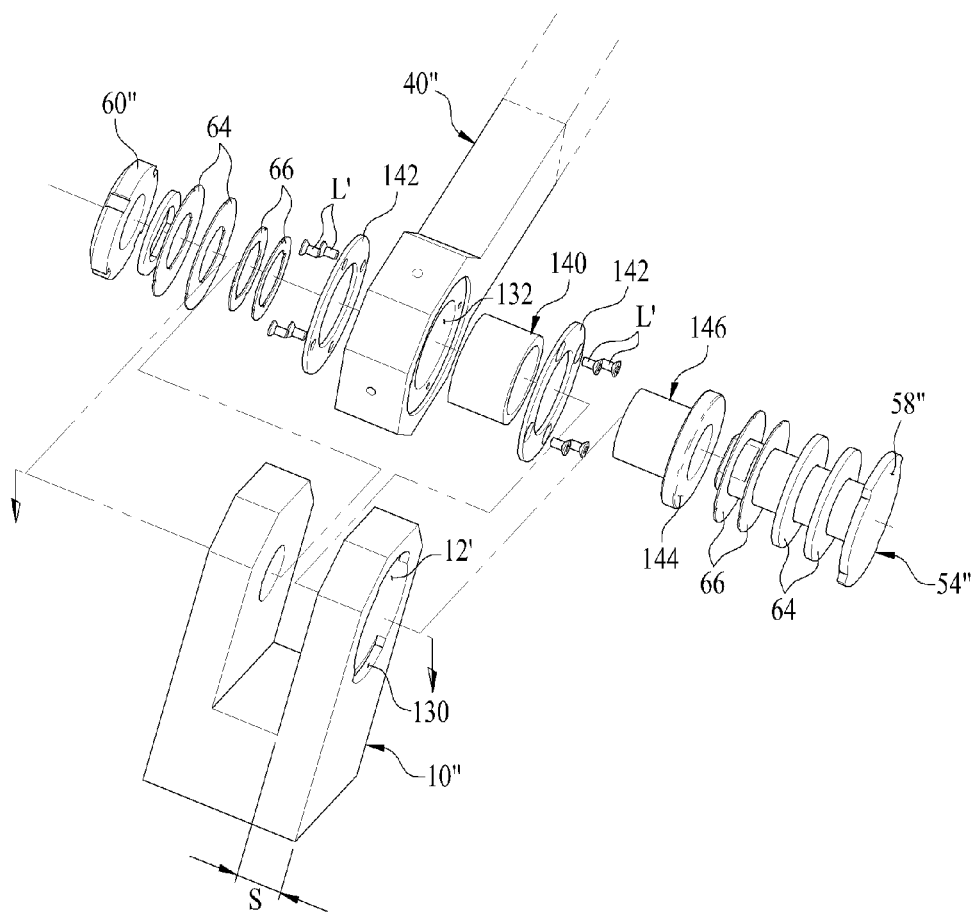
FIG. 12 is a schematic disassembled perspective views for describing a configuration of a first hinge connection unit and an assembled relationship thereof according to a second exemplary embodiment of the present invention in FIG. 1A.
Figure 15:
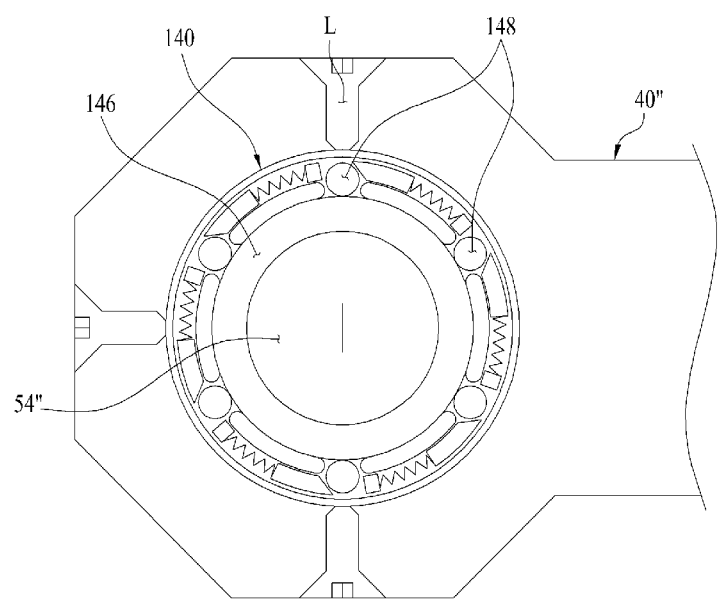
FIG. 15 is a schematic cross sectional view for describing an assembled relationship of each component and an operational relationship thereof based on the arrow line XV-XV of FIG. 14.

As illustrated in FIGS. 12 and 15, a bush 146 having a flange unit 144 at the other side in a shape of a steel pipe is inserted inside of the clutch bearing 140 from the other side.

At this time, a needle roller 148 provided at the clutch bearing 140 contacts with an outer circumferential surface of the bush 146 and increases the friction pressure so that the other end of the movable frame 40" does not rotate about the bush 146 in the direction to which the weight is applied while allowing the movable frame 40" to rotate freely in the opposite direction.

The clutch bearing 140 plays a role of the operations of the first ratchet wheel 56 and the first pole 30 through the slit 44 in the first exemplary embodiment.

In addition, there is an area contact relationship between the flange unit 144 of the bush 146 and the guard 142 facing the same, and inside the bush 146, one side of the central shaft 54" inserted from the other side of the base frame 10" passes through from the other side to one side.

In addition, at the other side of the central shaft 54", there is formed a protrusion 58" which is configured to be correspondingly inserted into the key groove 13 formed at the circumferential surface of the assembly hole 12' of the base frame 10". The rotation of the central shaft 54" may be prevented against the base frame 10" with the aid of the protrusion 58".

Figure 13:
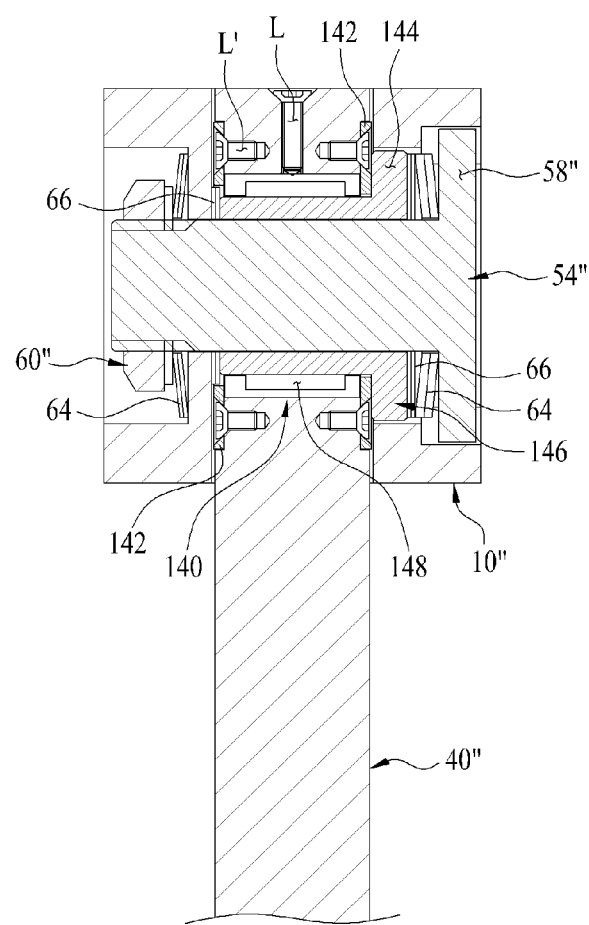
FIG. 13 is a schematic cross sectional view for describing an assembled relationship of each component and an operational relationship thereof based on the arrow line XII-XII of FIG. 12.

The pressing member 60", as illustrated in FIG. 13, is engaged to one side of the central shaft 54", and as described in the description of the first pressing unit part of the first exemplary embodiment, if the pressing member 60" is engaged in the direction of the protrusion 58" of the central shaft 54", it presses the bush 146 including the movable frame 40" interposed between them.

In addition, one or more than one disk spring 64 is interposed between the protrusion 58" and the other side surface of the bush 146 or at one side surface of the movable frame 40" including the guard 142 so as to elastically support the pressing pressure due to the engagement of the pressing member 60".

At this time, it is preferred that the pressing pressure by the disk spring 64 may be limited by one side of the bush 146 protruding toward one side of the flange unit 144 of the bush 146 or the movable frame 40".

In other words, it is preferred that the pressing pressure by the pressing member 60" may be limited to the use for inhibiting the rotation of the bush 146 against the central shaft 54".

The thusly installed disk spring 64, as explained in the first exemplary embodiment, it may elastically provide friction pressure for preventing the rotation of the bush 146 with the pressure due to the engagement of the pressing member 60" using the central shaft 54" as a support basis.

Figure 14:
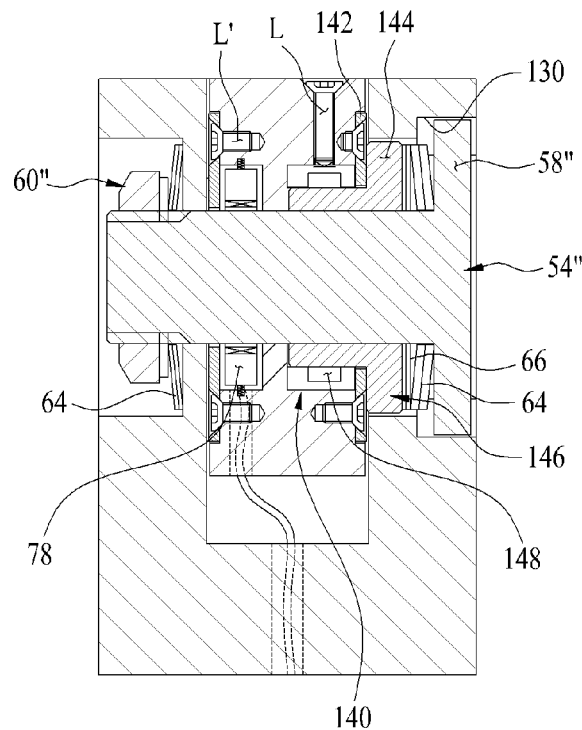
FIG. 14 is a schematic cross sectional view illustrating an assembly and operation of each component of a third brake unit and a second brake unit.

In addition, it is preferred that there are further provided a pair of opposite washer member 66 configured to press a portion where elastic pressing pressure is applied by the disk spring 64, namely, a portion between the other side surface of the flange unit 144 of the bush 146 and the disk spring 64 facing the same, a portion between one side of the bush 146 protruding toward one side of the movable frame 40" and the pressing member 60" to which pressing pressure is applied in response thereto or the base frame 10" and as illustrated in FIGS. 13 and 14 a portion where they area-contact each other for thereby providing the pressing pressure instead of the same.

The function of the washer member 66 is referred to as that of the flat washer which replaces a friction pressure with respect to other rotations of each component replacing the friction relationship about the central shaft 54", wherein the washer member 66 is made from a material with a wear resistance and durability and is formed of a flat surface allowing a pair of opposite surfaces to slide against each other.

In each configuration of the first hinge connection unit A' of the above-described second exemplary embodiment of the present invention, the components of the brake unit including the central shaft 54", the bush 146, the clutch bearing 140 and the pressing member 60" providing a friction pressure (braking force) to the bush 146 with the aid of the support from the central shaft 54" is referred to as a third brake unit for convenience.

The operations of each component of the third brake unit according to the second exemplary embodiment of the present invention will be described.

First, the movable frame 40" is prevented from separating and at the same time becomes rotatable against the base frame 10" and the central shaft 54" with the aid of the engagement of the clutch baring 140 and the bush 146 and the central shaft 54", and the protrusion 58" and the pressing member 60" formed at the central shaft 54".

In addition, as illustrated in FIG. 15, the movable frame 40" is prevented from rotating in response to the weight applied from the other end through the clutch bearing 140 with respect to the bush 146 which is fixed when the pressure is below the friction pressure based on the engagement pressure of the pressing member 60" and becomes a rotation-free state in the opposite upward direction.

In addition, as for the direction where the other end of the movable frame 40" is lifted up, the clutch bearing 140 is in a rotation-free state from the bush 146 to which pressing pressure is applied, so the clutch bearing 140 may easily rotate even by a user's force.

Exemplary Embodiment 3

Figure 7:
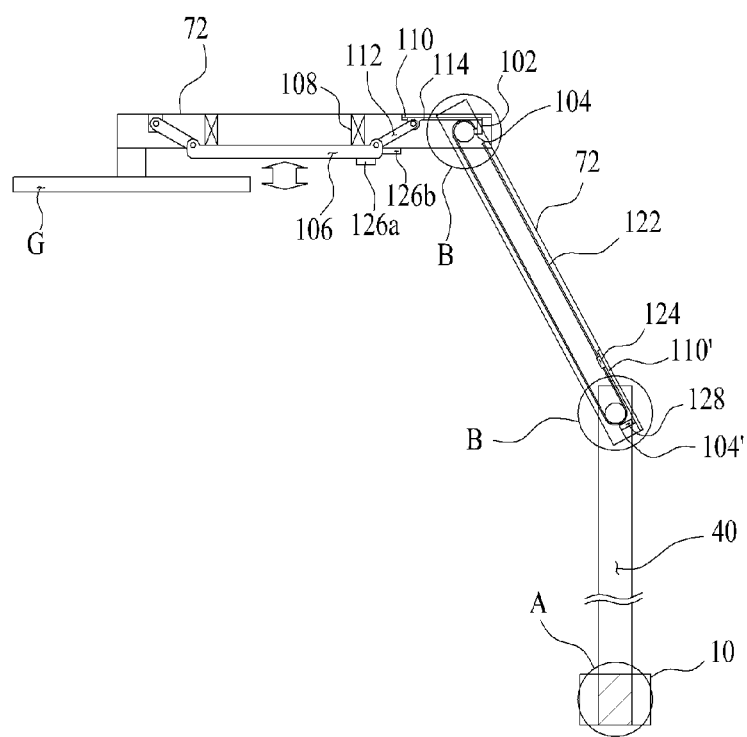
FIG. 7 is a schematic view for describing a horizontal direction swivel motion relationship of connection frames.

As illustrated in FIGS. 1A, 1B and 7, one end of the connection frame 72 is connected through the second hinge connection unit "B" to the other end of the movable frame 40 in such a way that it may rotate (swivel motion in the horizontal direction) in the horizontal direction.

The thusly connected connection frames 72 may be folded on the top or bottom of the movable frames 40, 40' and 40" based on the rotation positions or may become estranged with respect to the movable frames 40, 40' and 40" about the second hinge connection unit "B".

In addition, other connection frames 72 are in series connected to the other end of the connection frame 72 in a connection type where the other end of the movable frame 40 is connected to one end of the connection frame 72 through the second hinge connection unit "B".

As for this connection relationship, in case where the connection frames 72 extend long from the base frame 10, 10' and 10", the weight applied to the other end of the connection frame 72 which is positioned at the last end may be applied beyond the braking force of the first and third brake units thanks to the increased moment for thereby rotating the movable frames 40, 40' and 40".

To overcome the above-mentioned problem, the present invention provides a second brake unit so as to further brake the rotations of the movable frames 40, 40' and 40" with respect to the central shafts 54, 54' and 54" in response to the increased moment.

The present invention also provides a displacement adjusting unit which is configured to adjust the braking performance of the second brake unit for thereby coping with the series connection of the connection frames 72 through the second hinge connection unit "B".

As illustrated in FIGS. 2 to 4A, the second brake unit may be installed in such a way to form a first installation groove 74, whose inner diameter is more expanded, at a circumferential surface of at least one of the contacting third and fourth through holes 46 and 48, and a guide groove 76 formed at the movable frame 40 wherein one end of the guide groove 76 communicates with the first installation groove 74, and the other end thereof is connected to the other end of the movable frame 40.

The first installation groove 74 is provided so as to partition an installation space of the second brake unit with respect to the outer circumferential surface of the central shaft 54 by partitioning the region where the first pressing unit part does not influence, and the guide groove 76 is provided so as to form an installation space of the displacement adjusting unit, so such components don't have any limits in types.

As illustrated in FIGS. 2 to 4B, the guide groove 76 may communicate with the guide groove 96 in order for a cable "C" such as an electric cable, etc., which is guided through the base frame 10, to be installed through the guide groove 76.

The thusly installed second brake unit, as illustrated in FIGS. 2 to 4B, includes a brake shoe 78 one end of which is hinged to a portion in the direction of one end of the movable frame 40 in the first installation groove 74.

The intermediate portion of the brake shoe 78 is preferably formed in a curved shape to surround and area-contact with the outer circumferential surface of the central shaft 54 corresponding based on the rotation position. The other end of the brake shoe 78 is connected to the displacement adjusting unit through the guide groove 76 which communicates in the direction of the other end of the movable frame 40 in the first installation groove 74.

In addition, the second brake unit includes a return spring 79 which is connected to the inner wall of the first installation groove 74 and the brake shoe 78 corresponding to the same for thereby providing elastic force in the direction where the brake shoe 78 separates from the central shaft 54.

Meanwhile, as illustrated in FIGS. 2 to 6B, the displacement adjusting unit includes a first tensile member 80 of which one end is fixed at the other end of the brake shoe 78, and the other end is supported by one end of the guide groove 76 and is guided in the inward direction, a first buffer member 82 which is installed in the guide groove 76 and of which one end is connected to the other end of the first tensile member 80 and which is elastically extendable, and a second tensile member 84 of which one end is fixed at the other end of the first buffer member 82, and an intermediate portion is sequentially wound more than one time around the second hinge connection unit "B", and the other end is fixed at the portion of the other end of the connection frame 72 which is positioned at the last end.

In addition, the first and second tensile members 80 and 84 may be formed in a wire or band shape, and at the portion of the other end of the connection frame 72 which is at the last end, there may be further provided a second buffer member 88 configured to adjust the length of the second tensile member 84 in such a way to fix or wind the other end of the second tensile member 84 or to change the installation path.

As for another type of the displacement adjusting unit, there are provided a third tensile member 86 of which one end is fixed at the other end of the brake shoe 78, the intermediate portion is guided from one end of the guide groove 76 and is wound one or more than one time around the second hinge connection unit "B", and the other end is formed in a wire shape or a band shape connected to the other end of the connection frame 72 of the last end, and a third buffer member 90 which is installed at the other end of the last connection frame 72 for thereby fixing the other end of the third tensile member 86 and elastically winding or pulling the third tensile member.

Here, the first, second and third buffer members 82, 88 and 90 may be referred to as a typical member or device including a tensile spring, a leaf spring, a rubber, a spiral spring, etc. which is capable of adjusting the difference in the tensile length within a limited range based on the tensile force applied to the second and third tensile members 84 and 86.

Figure 5:
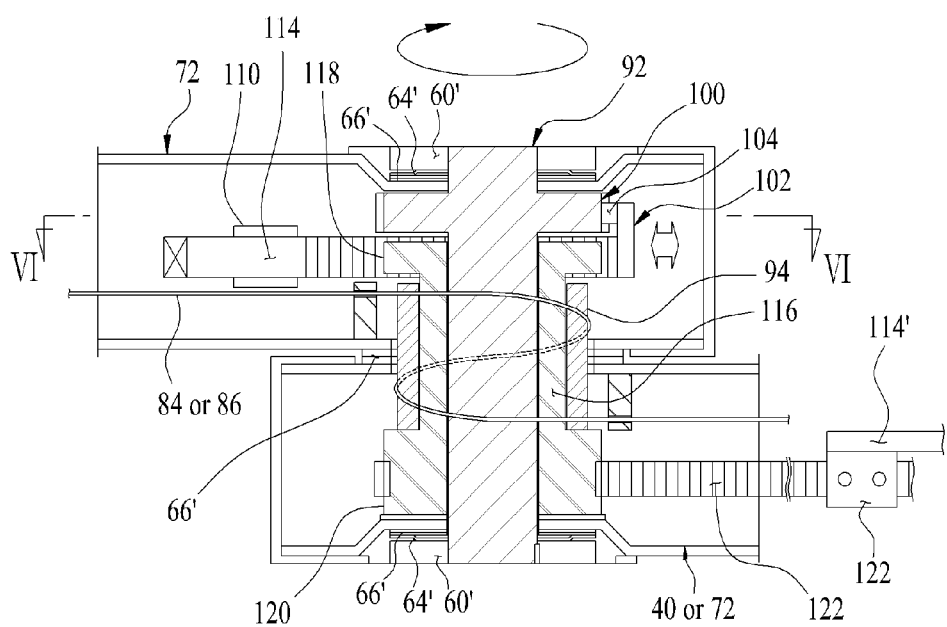
FIG. 5 is a schematic cross sectional view for describing a configuration of a second hinge connection unit of FIG. 1A and the assembled relationship of the components and the operational relationship of the components.
Figure 6B:
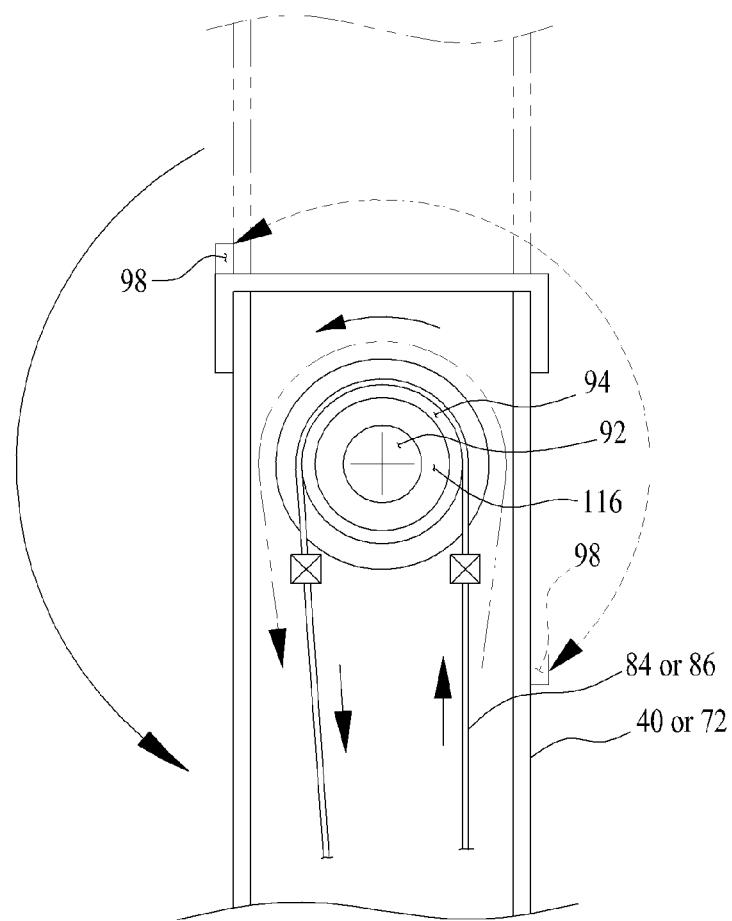

As mentioned above, it is preferred that the second hinge connection unit "B" around which the second tensile member 84 or the third tensile member 86 is wound, as illustrated in FIG. 5, includes a vertical hinge shaft 92 which is installed passing through the portion where the other end of the movable frame 40, one end of the neighboring connection frame 72 or the other end and one end of the neighboring connection frame 72 partially overlap on each other, and a roller 94 which is freely rotatable on the vertical hinge shaft 92 in a cylindrical shape surrounding the vertical hinge shaft 92.

At this time, it is obvious that at both ends of the vertical hinge shaft 92, there may be provided a typical second pressing unit part configured to prevent the connection frames 72 of one side and the other side which are connected about the vertical hinge shaft 92 from separating in the longitudinal direction of the vertical hinge shaft 92.

In addition, the second pressing unit part may be configured in the ways of elastically pressing the other end portion of the movable frame 40 interposed between both ends of the vertical hinge shaft 92, one end portion of the connection frame 72 connected thereto or the other end portion and one end portion of the neighboring connection frames 72, more specifically, may be configured in the braking relation configuration based on the engagements of the disk spring 64, the washer member 66 and the pressing member 60 of the first pressing unit part.

In addition, it is preferred that the second and third tensile members 84 and 86 are wound one or more than one time around the roller 94, and are in series connected from the connection frame of one side to the connection frame 72 of the other side among the connection frames 72 connected by a corresponding second hinge connection unit "B".

In addition, if the direction where the wire type second and third tensile members 84 and 86 are wound with respect to the roller 94 has a relationship where the connection frame 72 positioned at the other side about the second hinge connection unit "B" rotates in one direction (for example, in the clockwise direction) to be unfolded, the second and third tensile members 84 and 86 are wound in the same direction (in the clockwise direction), and it is preferred that each of the connection frames 72 includes a stopper 98 for preventing themselves from rotating more in case where the connection frames 72 extend maximally from the base frame 10.

Finally, the stopper 98 has a function for limiting the angular range where each of the connection frames 72 rotates about the second hinge connection unit "B" with respect to the longitudinal direction of the movable frame 40.

According to the second brake unit, in case where a plurality of connection frames 72 including the movable frame 40 extend in the maximum lengths from the base frame 10, the second and third tensile members 84 and 86 may be wound maximally with respect to the vertical hinge shaft 92, respectively.

The thusly wound second and third tensile members 84 and 86 allow the brake shoe 78 to press the central shaft 54 while allowing due to the limited length the connected first tensile member 80 to be pulled in the direction of the other end, wherein the friction force of the brake shoe 78 provides a braking force for preventing the rotations of the movable frame 40.

Along with this, each of the first, second and third buffer members 82, 88 and 90 adjusts based on an elastic transformation level itself the difference where the second and third tensile members 84 and 86 are wound around the vertical hinge shaft 92 as compared with the displacement based on the rotations of the brake shoe 78.

In other words, the second brake unit further provides a braking force in response to the degree where the position of the item "G" has distanced from the base frame 10 in addition to the braking force of the first brake unit for thereby stably maintaining the installation state of the item "G".

Along with this, the cable "C" connected from the base frame 10 and through the guide groove 96 and to the supporter "H", not illustrated in the drawing, may be substituted with the second and third tensile members 84 and 86 or it may be connected to the other end of the last connection frame 72 in the same way as the second and third tensile members 84 and 86.

Each of the first, second and third tensile members 80, 84 and 86 and the first, second and third buffer members 82, 88 and 90 of the second brake unit, the second and third tensile members 84 and 86 are wound around the roller 94 with a diameter smaller as compared to the extended length, so elastic recovery force of the first, second and third buffer members 82, 88 and 90 may be lightly applied with respect to the winding direction, but it is obvious that such elastic recovery force of the first, second and third buffer members 82, 88 and 90 may allow the connection frames 72 to be folded.

Exemplary Embodiment 4

In the articulation type supporter according to the present invention, it may need to perform a swivel motion with respect to the movable frames 40, 40' and 40" and the plurality of the connection frames 72 based on the user's intention.

In response to such phenomenon, as illustrated in FIG. 7, a refraction transformation (swivel motion in the horizontal direction) is made between the connection frames 72 including the vertical hinge shaft 92 and the movable frame 40 connected through the vertical hinge shaft 72 by means of the user's handling, and in case where there is not any user's handling, it needs to install a stopping unit which is capable of maintaining the shape.

In other words, The stopping unit performs a function of regulating the rotation (swivel) in response to the user's handling in order for the movable frame 40 and the connection frame 72 rotatably interconnected about the second hinge connection unit "B" or the neighboring connection frames 72 to estrange about the vertical hinge shaft 92 or to be folded.

Here the above mentioned stopping unit has been described together with the configuration where the second pressing unit part (the braking-related configuration based on the engagement of the disk spring 64', the washer member 66' and the pressing member 60') is installed at both ends of the vertical hinge shaft 92, but it is not limited thereto. Such a configuration may be adopted in case that the braking force by the second pressing unit part does not exist.

Figure 8A:
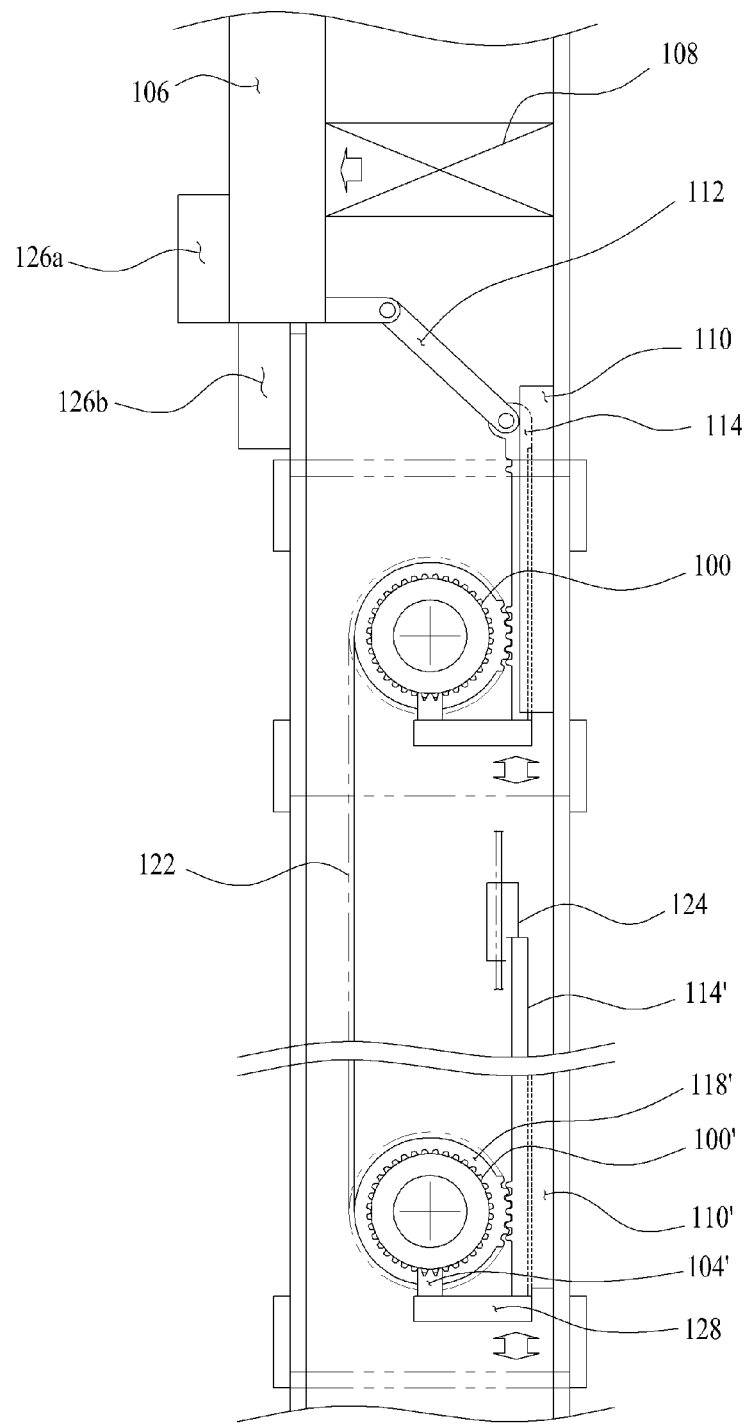
FIGS. 8A and 8B are schematic views for describing an interlocking relationship based on the operation of a lever of FIG. 7 by a user and an engaged relationship of a second ratchet wheel and a second pole.
Figure 8B:
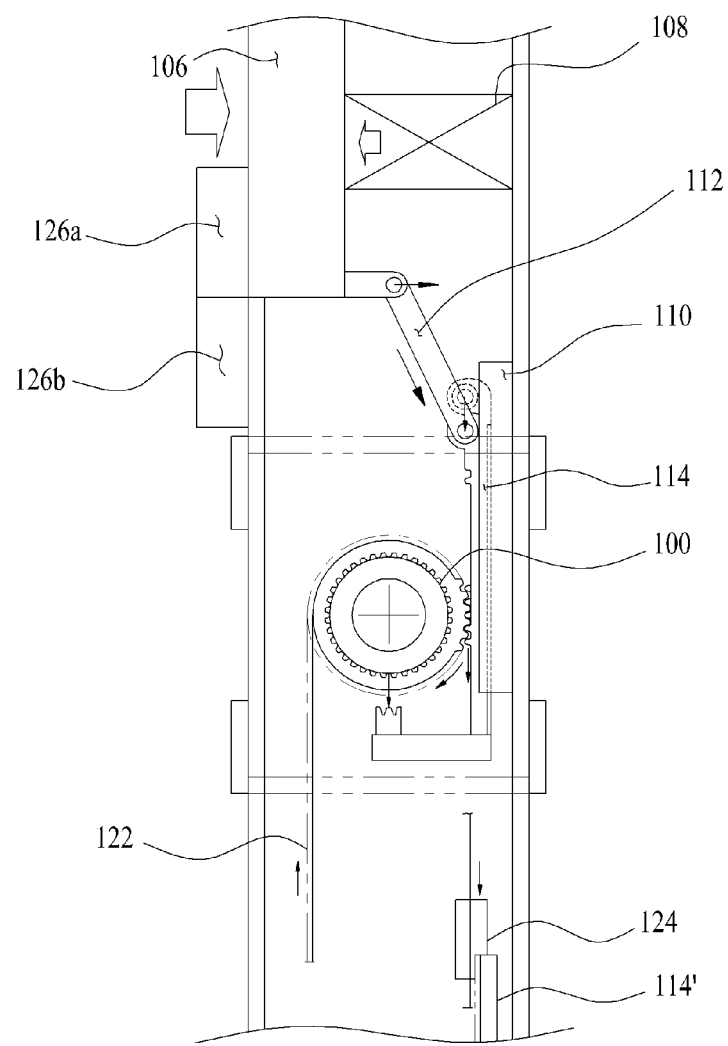

As illustrated in FIGS. 5, 8A and 8B, the configuration of one exemplary embodiment of the stopping unit includes a second ratchet wheel 100 fixed at the top or bottom of the vertical hinge shaft 92, a second pole 104 one end of which is shaped to tooth-engage with the second ratchet wheel 100, a first bracket 102 for fixing the other end of the second pole 104, a rack 114 allowing the installation of the first bracket 102, a guide rail 110 installed at the inner wall of the connection frame 72 for guiding the rack 114 to slide along the longitudinal direction of the connection frame 72, and a push bar 108 of which one end is hinged at the portion of the other end of the connection frame 72 which is positioned at the last end, and an intermediate portion of which protrudes toward the side portion of a corresponding connection frame 72, and the other end of which is provided inside of the level 106 connected through the link 112 to the rack 114 and the connection frame 72, for thereby providing elastic force in order for the lever 106 to protrude from the side portion of the corresponding connection frame 72.

In the above connection relation configuration, when the lever 106 is pressed to be inserted into the inner side of the corresponding connection frame 72 by the user, the rack 114 slides in response to the position displacement of the link 112, and the second pole 104 installed through the first bracket 102 with respect to the rack 114 has a relationship for releasing the tooth-engaged state with respect to the second ratchet wheel 100.

When the user's force applied to the lever 106 is released, the push bar 108 pushes the lever 106, and the rack 114 connected through the link 112 to the lever 106 slides to the original position with the aid of the guide of the guide rail 110, so the second ratchet wheel 100 and the second pole 104 are tooth-engaged again.

As illustrated in FIG. 5, the stopping unit includes a cylinder-shaped drum 116 interposed between the vertical hinge shaft 92 and the roller 94 and being rotation-free, a pinion 118 provided at a portion of one end of the drum 116 corresponding to the rack 114 and is tooth-engaged with the rack 114, a timing gear 120 which is provided at the other end of the drum 116 and rotates together with the drum 116, a timing belt 122 which is connected for the timing gear 120 positioned at a portion of one end of another connection frame connected to the second hinge connection unit "B" to interlock with one end of the connection frame 72 which is positioned at the last end, a second bracket 124 fixed at the timing belt 122, a rack 114' one end of which is fixed at the second bracket 124 and which receives a sliding guide of the guide rail 110' installed at the inner wall of the connection frame 72, a third bracket 128 installed at the other end of the rack 114', and a second pole 104' which is fixed at the third bracket 128 and is tooth-engaged with the second ratchet wheel 100' based on the sliding position of the rack 114'.

According to the configuration of the above-mentioned stopping unit, in a natural state where the user does not handle the lever 106, as illustrated in FIG. 8A, since the second poles 104 and 104' have the tooth-engaged relationship with the second ratchet wheels 100 and 100', the rotation of the connection frame 72 about the vertical hinge shaft 92 may be prevented.

Therefore, each of the connection frame 72 maintains an estranged shape based on the force combined with the braking force of each of the second pressing unit parts of the second hinge connection unit "B".

For example, assuming that the second hinge connection unit "B" is provided at two portions, and the braking force of the second pressing unit part of each portion is 10N, the braking force of the tooth-engaged state in the interlocking relationship corresponds to 20N which is obtained by summing the braking force of each portion.

In the above example, assuming that the second hinge connection unit "B" is provided at three portions, the braking force applied thereto may be 30N which is obtained by summing the raking force of each portion.

Meanwhile, if there is any operation of the lever 106 by the user (the counter action to the push bar 108), as the operation proceeds from FIG. 8A to FIG. 8B, each rack 114 and 114' receives a guide of the guide rail 110 based on the operation thereof, so the rack 114 and 114' slides in the direction where the tooth-engaged state of the second poles 104 and 104' with respect to the second latch wheels 100 and 100' is released.

Therefore, each connection frame 72 is affected by the braking force provided by the corresponding second pressing unit part with respect to the second hinge connection unit "B" of each position, so each connection frame 72 becomes a state where an individual swivel motion is possible.

Along with this, holders 126a and 126b may be further provided at the lever 106 or the connection frame 72 where the lever 106 is installed, so as to maintain the state where the lever 106 is pressurized by the user with the force being against the elastic force of the push bar 108.

Meanwhile, it is obvious that each configuration forming the second brake unit and the displacement adjusting unit, as illustrated in FIG. 14, may be applied to the first hinge connection unit having the third brake unit.

For this configuration, the clutch bearing 140 in the engaged state with the bush 146 in the sixth through hole 132 of the movable frame 40" is installed while being biased at the other side, and the second brake unit is provided at the portion of the remaining sixth through hole 132 with respect to the central shaft 54", and the second brake unit may be connected to the displacement adjusting unit at the movable frame 40".

In addition, it is obvious that the configuration of the stopping unit may be selectively applied to the operations of the first, second and third brake units.

| Legends of Reference Number | |
|---|---|
| S, S': structure | A, A': first hinge connection unit |
| B: second hinge connection unit | G: item |
| C: electric power cable | H: supporter |
| L, L': engaging member | |
| 10, 10', 10": base frame | 12, 12': assembly hole |
| 14: first pin groove | 16: engaging groove |
| 18: cable path | 20, 20': hinge hub |
| 22: first through hole | 24, 24': cutting unit |
| 26: second pin groove | 28: divide pin |
| 30: first pole | 32: first hinge pin |
| 34a, 34b, 34c: rotational angle support unit | 36: first elastic member |
| 38: second hinge pin | 40, 40', 40": movable frame |
| 42: horizontal hinge shaft | 44: slit |
| 46: third through hole | 48: fourth through hole |

-continued

Legends of Reference Number

| | |
|---|---|
| 50: fifth through hole | 52: engaging bolt |
| 54, 54', 54": central shaft | 56: first ratchet wheel |
| 58, 58', 58": protrusion | 60, 60' 60": pressing member |
| 62: fixing pin | 64: disk spring |
| 66, 66': washer member | 68: nut |
| 70: support member | 71: second through hole |
| 72: connection frame | 74: first installation hole |
| 76: guide groove | 78: brake shoe |
| 79: return spring | 80: first tensile member |
| 82: first buffer member | 84: second tensile member |
| 86: third tensile member | 88: second buffer member |
| 90: third buffer member | 92: vertical hinge shaft |
| 94: roller | 96: guide groove |
| 98: stopper | 100, 100': second ratchet wheel |
| 102: first bracket | 104, 104': second pole |
| 106: lever | 108: push bar |
| 110, 110': guide rail | 112: link |
| 114, 114': rack | 116: drum |
| 118, 118': pinion | 120: timing gear |
| 122: timing belt | 124: second bracket |
| 126a, 126b: holder | 128: third bracket |
| 130: key groove | 132: sixth through hole |
| 140: clutch bearing | 142: guard |
| 144: flange unit | 146: bush |
| 148: needle roller | |

I claim:

1. An articulation type supporter, comprising:
a base frame which is rotatably installed at a structure;
a movable frame of which one end is connected to the base frame and a first hinge connection unit, and the other end rotates by receiving a guide of the first hinge connection unit; and
a plurality of connection frames which are in series connected through a portion of the other end of the movable frame and a plurality of second hinge connection units which are arranged with a predetermined interval from the portion of the other end of the movable frame, wherein a supported is connected to the connection frames so as to mount a predetermined item on the top of an end portion of the last position, and
the first hinge connection unit includes a brake unit which enables a free upward rotation motion of the movable frame and is configured to provide pressure in order for a downward rotation motion of the movable frame to be performed with respect to a previously set weight which is applied from the other end of the movable frame,
wherein the brake unit comprises a first brake unit which includes:
a central shaft which is installed passing through the base frame and the movable frame through a center of a horizontal hinge shaft;
a fixing unit part which is configured to prevent the separation of the movable frame with respect to the base frame through both ends of the central shaft;
a first ratchet wheel which is configured to prevent rotation at the central shaft corresponding to a slit;
a first pole of which one end is hinge-connected to the base frame or an inner side of a hinge hub, and the other end elastically rotates by a first elastic member and is tooth-engaged with the first ratchet wheel through the slit when the other end of the movable frame rotates downward; and
a first pressing unit part which is installed at the central shaft and provides pressure to both sides of the movable frame based on the support of the base frame.

2. The supporter of claim 1, wherein the first hinge connection unit comprises:
the hinge hub which is disposed at the base frame and forms an opening in the direction of one side;
the horizontal hinge shaft which is rotatably supported since a boss shape protruding from one end of the movable frame to the other side is inserted inside of the hinge hub and includes the slit which passes through the inner and outer sides at a part of the section of the surrounding of the side wall; and
the brake unit.

3. The supporter of claim 1, wherein the central shaft includes a protrusion which is formed at an outer circumferential surface biased toward one side of the movable frame and protrudes vertically in the longitudinal direction, and the first pressing unit part is configured in such a way that at the other side surface of the movable frame including the horizontal hinge shaft, there is provided a pressing member configured to provide an engaging pressure in the direction of the protrusion based on the position engaged from the other end of the central shaft to one end with respect to the base frame.

4. The supporter of claim 1, wherein the first pressing unit part includes a pressing member which is engaged in the direction of the center at both ends of the central shaft and provides an engaging pressure in order for the movable frame including the horizontal hinge shaft disposed between them to be pressed.

5. The supporter of claim 3, wherein there is provided a disk spring which is disposed at a central shaft between one side surface of the movable frame and the opposite protrusion and between the other side surface of the movable frame including the horizontal hinge shaft and the opposite first ratchet wheel or between one side surface of the movable frame including the horizontal hinge shaft or the other side surface and the opposite first ratchet wheel, and is configured to elastically support the interval between the components with the aid of the pressure from the engagement of the pressing member.

6. The supporter of claim 5, wherein there are further provided a pair of opposite washer members which each have a friction coefficient lower than that of each component and are disposed between the portions where the rotations of each opposite component are relatively performed in the longitudinal direction of the central shaft, wherein the portions include a portion between one side surface of the movable frame and the opposite disk spring, a portion between the other side surface of the movable frame including the horizontal hinge shaft and the opposite disk spring, a portion between one side surface of the base frame or one side surface of the hinge hub and the opposite other side surface of the movable frame including the horizontal hinge shaft or a portion between the disk springs facing one side surface and the other side surface of the movable frame including the horizontal hinge shaft and a portion between the other side surface of the movable frame including the horizontal hinge shaft and the opposite first ratchet wheel.

7. The supporter of claim 5, wherein the fixing unit part is formed of a nut which is configured to move the central shaft to the other side based on the support of the other side surface of the base frame or the hinge hub when engaging from the other end of the central shaft in a state where one side of the movable frame is supported by the protrusion or the pressing member.

8. The supporter of claim 7, wherein the base frame forms an assembly hole passing through one side and the other side, and one or more than one first pin groove is formed with a predetermined width and depth in the direction of one side along the surrounding of a portion of a circumferential surface of the other side of the assembly hole, and the hinge hub forms a first through hole through the center of which a portion of the other end of the central shaft passes in a cap shape inserted from the other side of the assembly hole to one side, and a shape formed since a portion corresponding to the first pole in the surrounding of the side wall is cut or a cutting unit concave at the inner wall is provided, and a second pin groove having a predetermined depth is formed in the direction of the center on an outer circumferential surface corresponding to the first pin groove, and an end portion of the divide pin is engaged and inserted into the second pin groove, and the other end of the divide pin is engaged with and is inserted into the first pin groove, and the fixing unit part includes:

a support member which forms a second through hole through which a portion of the other end of the central shaft passes and is arranged so that a portion of an outer circumferential surface of one side of the second through hole comes into close contact with the other side surface of the hinge hub, and a portion of an edge of the outer side comes into close contact with the other side surface of the base frame; and a nut which is closely thread-engaged over from a portion of the other end of the central shaft, which protrudes through the second through hole, to the other side surface of the support member.

9. The supporter of claim 1, wherein the movable frame forms, at a portion of one end, a third through hole through which the central shaft passes, and the horizontal hinge shaft forms at one side a fourth through hole through which the central shaft passes and forms, from a portion of the center to the other side, a fifth through hole formed in a shape more expanded than the fourth through hole and having an inner diameter than the outer diameter of the first ratchet wheel, and the slit is formed at the side wall of the fifth through hole corresponding to the first ratchet wheel, and the engagement of the horizontal hinge shaft with respect to the other side surface of the movable frame is performed in such a way that engaging bolts arranged at regular intervals on the concentric circle about the third and fourth through holes pass through one side of the movable frame and are engaged with the horizontal hinge shaft.

10. The supporter of claim 9, wherein one end of the first connection frame among the connection frames is rotatable in the horizontal direction about the second hinge connection unit and is connected to the other end of the movable frame in such a way that one end of the first connection frame may be folded or estranged with respect to the movable frame based on the position of the rotation, and the remaining connection frames are in series connected in a connection way of the first connection frame with respect to the other end of the movable frame through the second hinge connection unit, and a first installation groove of which an inner diameter is further expanded is formed in least one circumferential surface in the third and fourth through holes which contact with each other, and the movable frame forms a guide groove of which one end communicates with the first installation groove, and the other end extends to the other end of the movable frame, and the second brake unit is installed inside of the first installation groove, and in the guide groove, there is provided a displacement adjusting unit of which one end is connected to the second brake unit, and the other end is connected to the connection frames based on an in-series connection through one or more than one second hinge connection unit, for thereby adjusting a braking performance of the second brake unit based on the arrangements of the connection frames including the movable frame.

11. The supporter of claim 1, wherein the first hinge connection unit comprises:

a central shaft which is installed passing through the base frame and the movable frame;

a fixing unit part which is configured to prevent separation of the movable frame with respect to the base frame through both ends of the central shaft; and the brake unit, and wherein the brake unit comprises:

a third brake unit, including:

a bearing clutch which is engaged at the movable frame through which the central shaft passes;

a bush which is rotatably installed at the central shaft and has an outer circumferential surface in a shape of a steel pipe having a flange unit at the other side is correspondingly inserted into the bearing clutch; and a pressing member which is installed at the central shaft and provides pressure to the flange unit of the bush based on the support of the base frame.

12. The supporter of claim 11, wherein the bearing clutch and the bush are inserted from the other side of the movable frame, and a second installation groove is formed at one side of the movable frame and about the central shaft, and the movable frame further includes a guide groove of which one end communicates with the first installation groove, and the other end extends to the other end of the movable frame, and the second brake unit is inserted in the second installation groove; and in the guide groove, there is provided a displacement adjusting unit of which one end is connected to the second brake unit, and the other end is connected to the connection frame based on an in-series connection through one or more than one second hinge connection unit, for thereby adjusting the braking performance of the second brake unit based on the arrangement of the connection frame including the movable frame.

13. The supporter of claim 10, wherein the second brake unit comprises: a brake shoe of which one end is hinged at a portion of the direction of one end of the movable frame in the first installation groove, and the intermediate portion is shaped to have an area contact at the outer circumferential surface of the central shaft in response to the rotation position, and the other end is connected to the displacement adjusting unit; and a return elastic member which is installed at an inner wall of the first installation groove and provides an elastic force for the brake shoe to be estranged from the central shaft.

14. The supporter of claim 13, wherein the displacement adjusting unit comprises:

a first tensile member of which one end is fixed at the other end of the brake shoe and the other end is guided to its inner side based on a support at one end of the guide groove;

a first buffer member which is installed inside of the guide groove and of which one end is connected to the other end of the first tensile member and is elastically contractible; and a second tensile member of which one end is fixed at the other end of the first buffer member, and the intermediate portion is wound one or more than one time sequentially around the second hinge connection unit, and the other end is fixed at a portion of the other end of the connection frame of the last end.

15. The supported of claim 13, wherein the first and second tensile members are formed in a shape of a wire or a band, and at a portion of the other end of the connection frame positioned at the last end, there is further provided a second buffer member which is capable of adjusting the length of the second tensile member including a way of winding the length by the other end of the second tensile member or changing the installation path.

16. The supporter of claim 13, wherein the displacement adjusting unit comprises:

a wide or band-shaped third tensile member of which one end is fixed at the other end of the brake shoe, the intermediate portion is guided from one end of the guide groove and is wound one or more than one time around the second hinge connection unit, and the other end is connected to the other end of the connection frame; and a third buffer member which is installed at the other end of the last connection frame for thereby elastically fixing and winding the other end of the third tensile member.

17. The supporter of claim 16, wherein the second hinge connection unit includes:

a vertical hinge shaft which is installed passing through a portion where the other end and one end of each of the neighboring connection frames are overlapped; and a roller which is rotation-free on the vertical hinge shaft in a cylinder shape surrounding the vertical hinge shaft, and wherein the second and third tensile members are connected in series from one side to the other side among the connection frames which are wound by the roller and are connected by the second hinge connection unit.

18. The supporter of claim 17, wherein the second hinge connection unit comprises a second pressing unit part which is configured to press for preventing the connection frames interposed based on the engaging position in the direction of the center at both ends of the vertical hinge shaft from estranging from each other in the longitudinal direction of the vertical hinge shaft.

19. The supporter of claim 18, wherein at each of the connection frames which are rotatably connected to each other about the second hinge connection unit, there is provided a stopping unit which is configured to regulate the rotations of the same with respect to the vertical hinge shaft.

20. The supporter of claim 19, wherein the stopping unit comprises:

a second ratchet wheel which is fixed at the top or bottom of the vertical hinge shaft;

a second pole of which one end is tooth-engaged with the second latch wheel;

a first bracket which is configured to fix the other end of the second pole;

a rack which enables the installation of the first bracket;

a guide rail which is installed at an inner wall of the connection frame and guides the rack to slide along the longitudinal direction of the connection frame;

a lever of which one end is hinge-connected to a portion of the other end of the connection frame positioned at the last end, the intermediate portion protrudes from the inside through the side portion of the corresponding connection frame, and the other end is connected through a link to the rack; and a push bar which is provided inside of the connection frame and provides an elastic force in order for the lever to protrude from the side portion of the corresponding connection frame.

21. The supporter of claim 20, wherein the stopping unit comprises:

a cylindrical drum which is interposed between the vertical hinge shaft and the roller and is rotation-free;

a pinion which is provided at a portion of one end of the drum corresponding to the rack and is engaged with the rack;

a timing gear which is provided at the other end of the drum and rotates together with the drum;

a timing belt which is connected in order for the timing gear at one end of the connection frame positioned at the last end and the timing gear at one end of another connection frame connected to the second hinge connection unit to interlock with each other;

a second bracket which is fixed at the timing belt;

another rack of which one end is fixed at the second bracket and which is slide-guided by the guide rail installed at the inner wall of the another connection frame;

a third bracket which is installed at the other end of the another rack; and a second pole which is fixed at the third bracket and is tooth-engaged with the second ratchet based on the sliding position of the another rack.

22. The supporter of claim 1, wherein the central shaft is formed in a shape of a circular pillar, and the side wall is chamfered along the longitudinal direction from one or more than one end among both ends of the longitudinal direction to the portion where the first ratchet wheel is installed, and the first ratchet wheel forms at the center an insertion hole corresponding to the chamfered cross section shape of the central shaft.

23. The supporter of claim 1, wherein the base frame and the movable frame and a plurality of the connection frames communicate along the longitudinal direction of each configuration in order for a cable path formed inside for the installation of an electric power cable extending from the outside to extend in series to the supporter.

* * * * *